United States Patent [19]
Lavallee

[11] 3,726,993
[45] Apr. 10, 1973

[54] DATA COMPRESSION METHODS AND APPARATUS

[75] Inventor: Pierre A. Lavallee, Penfield, N.Y.
[73] Assignee: Xerox Corporation, Stamford, Conn.

[22] Filed: Dec. 10, 1971
[21] Appl. No.: 206,795

[52] U.S. Cl. ................178/6, 178/DIG. 3, 325/38 B, 340/347 DD
[51] Int. Cl. ..............................................H04n 7/12
[58] Field of Search ............................178/6, DIG. 3; 325/38, 38.1; 340/347 DD

[56] References Cited

UNITED STATES PATENTS

| | | | |
|---|---|---|---|
| 2,922,840 | 1/1960 | Lally | 178/DIG. 1 |
| 2,978,535 | 4/1961 | Brown | 178/DIG. 3 |
| 3,588,329 | 6/1971 | Monk | 178/DIG. 3 |

*Primary Examiner*—Howard W. Britton
*Attorney*—James J. Ralabate et al.

[57] ABSTRACT

Data compression methods and the apparatus therefor are provided in accordance with the teachings of the present invention. According to one embodiment of this invention data signals are progressively combined to form successively decreasing numbers of groups of combined signals until a single group of signals is obtained. Those groups of combined signals containing non-redundant information are selectively transmitted. The selectively transmitted groups of combined signals are received and decoded whereby original data signals are regenerated. The data signals may comprise a multibit digital word or may represent video information. Encoding of the data signals removes redundant portions therefrom.

35 Claims, 5 Drawing Figures

DATA COMPRESSION METHODS AND APPARATUS

This invention relates to an information communication system and more particularly to a method of reducing the amount of data transmitted in an information communication system and the apparatus therefor.

It is frequently encountered in the information communication art that the bandwidth requirements of a communication channel are not compatible with the bandwidth of the information signals representing the information to be transmitted. This occurs when a communication channel such as a conventional telephone line is utilized for the transmission of digital signals. The digital signals may represent telemetry information, information obtained from a digital computer, video information, facsimile information, or the like. Various techniques such as frequency shift keying and phase shift keying have been employed to modify the digital signals such that the digital signals may be transmitted over the particular communication channel. Unfortunately these techniques fail to reduce the amount of data signals that are required to represent the information to be transmitted. Hence, if the data capacity of a particular communication channel is fixed, the foregoing techniques do not improve the efficiency of transmission of said communication channel.

The prior art has developed various systems for increasing the amount of information that may be transmitted over a fixed capacity communication channel. It is recognized by those of ordinary skill in the art that in facsimile communication systems for example, the largest portion of the transmitted video information represents background area and is redundant. If such redundancy is removed prior to transmission the efficiency of the system may be improved. One particular system includes predictive techniques wherein a code representing a mathematical function which describes an information signal is transmitted instead of the information signal itself. However, this only approximates the information signal and accurate recovery thereof from the coded representation is prejudiced. Other systems incorporate run length coding of video information, delta modulation of digital information, and the like. A common feature of these systems is the removal of redundant information and the transmission of non-redundant information. Consequently, if the amount of data representing the information to be transmitted may be reduced by say one-third, the fixed capacity communication channel may be successfully utilized to transmit three times as much information. Stated otherwise, as the amount of data is compressed, the bandwidth required to transmit the information is correspondingly compressed. A typical prior art system of the type just described is disclosed in U.S. Pat. No. 3,588,329 which issued to J. Monk on June 28, 1971 and is assigned to Xerox Corporation, the assignee of the present invention.

Unfortunately the data compression systems of the prior art generally consist of highly complex and expensive coding devices. In addition, the data compression systems of the prior art usually admit of singular application; that is, a system designed to operate on video information does not provide satisfactory results on digital information.

Therefore, it is an object of the present invention to provide a method of data compression and the apparatus therefor.

It is another object of the present invention to provide a method of and apparatus for reducing the amount of data required to transmit information in such manner that the transmitted data is sufficient to enable accurate recovery of said information.

It is a further object of this invention to provide a method of and apparatus for encoding a multibit digital word to substantially eliminate redundant portions thereof.

It is yet another object of this invention to provide a unique method of transmitting video information, and the apparatus therefor, whereby redundant portions of the video information are eliminated.

A still further object of this invention is to provide a method of and apparatus for regenerating information including redundant and non-redundant portions from compressed data.

It is another object of this invention to provide a data compression system for use in a digital or video information communication system.

Various other objects and advantages of the invention will become clear from the following detailed description of an embodiment thereof and the novel features will be particularly pointed out in connection with the appended claims.

In accordance with this invention, the method of transmitting data compressed information and the apparatus therefor is provided wherein original information signals are progressively combined to form groups of combined signals, and said groups of combined signals are further combined to form successively smaller groups until a single group of combined signals is obtained; the groups of combined signals are selectively transmitted in accordance with the presence of non-redundant information contained therein; if none of the groups of combined signals contains non-redundant information, a simple code representative thereof is transmitted; and the selectively transmitted groups of signals may be utilized at a receiving station for generating those groups of combined signals that were not transmitted whereby the original information signals are recovered. The information signals may represent digital information or video information. As the redundant portions of the information signals increase, the number of groups of combined signals selectively transmitted decreases thereby reducing the amount of data that must be transmitted to ensure successful recovery of the original information signals.

The invention will be more clearly understood by reference to the following detailed description of an exemplary embodiment thereof in conjunction with the accompanying drawings in which.

Figure 1:
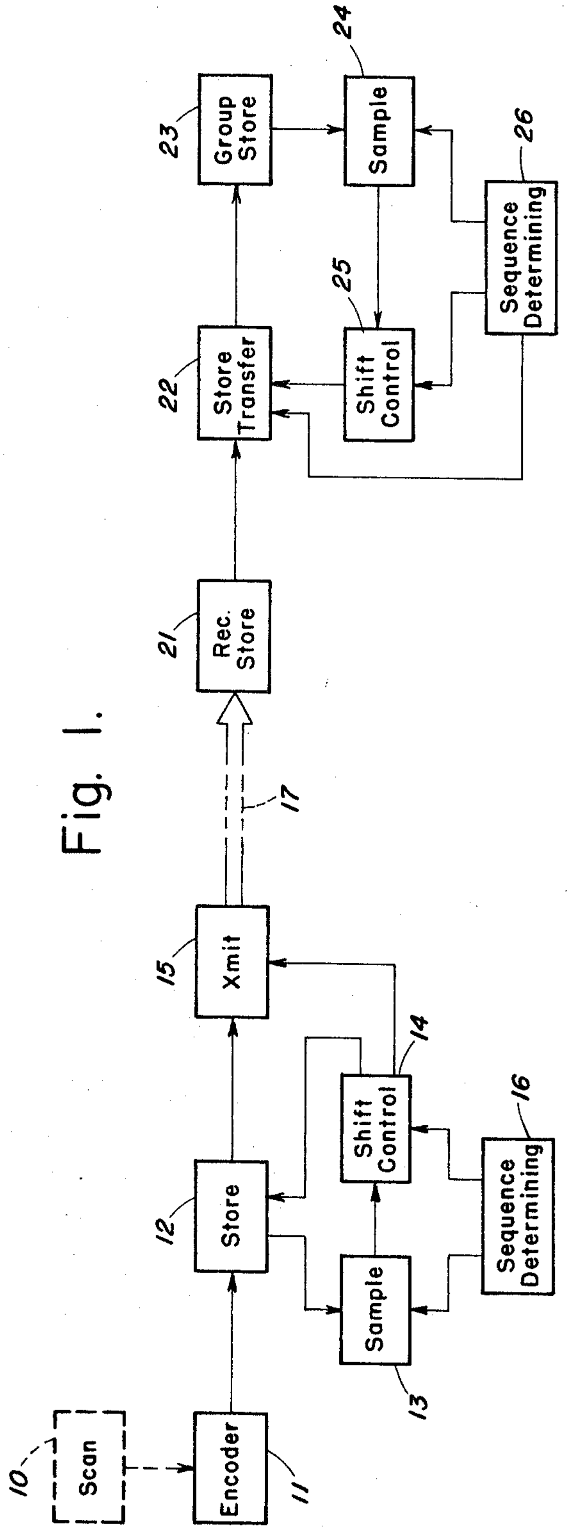
FIG. 1 is a block diagram representing the apparatus of the present invention.

Referring now to the drawings and in particular to FIG. 1, there is illustrated a block diagram of a data compression transmission system in accordance with the present invention comprising a transmitting station including a source of information 10, encoding means 11, sampling means 13, transmitting means 15, and sequence determining means 16. The source of information signals 10 may provide a multibit digital word such as may be obtained from conventional digital devices. Typical of these devices are digital computers, magnetic tape recorders, a matrix array of stored binary signals, a punch coded card reader or the like. Alternatively, the source of information signals 10 may comprise a conventional scanning means adapted to produce digital signals representative of scanned video information. Hence the scanning means may comprise a conventional television camera or a facsimile scanner such as a flying spot scanner or a matrix array of photoresponsive devices. Although the present invention admits of broad application, the forthcoming description will explain how the present invention is readily adapted to be utilized with a facsimile scanner employing a matrix array of photoresponsive devices.

The source of information signals 10 is coupled to encoding means 11. The encoding means 11 is a principal component of the present invention and will be further described in greater detail with respect to FIG. 2. It will suffice however for a general understanding of the present invention to recognize that encoding means 11 is adapted to combine the information signals supplied thereto by the source of information signals 10 such that a plurality of groups of combined signals is formed, which groups of combined signals are further combined to form smaller pluralities of groups until a single group of combined signals is obtained. The information content of each group of combined signals may be represented by a signal admitting of a first or second state. The convention herein adopted will assume that a signal admitting of a first state indicates that the group of combined signals associated therewith contains non-redundant information. Conversely, a signal admitting of a second state indicates that the group of combined signals associated therewith contains redundant information. Encoding means 11 is coupled to transmitting means 15 via storage means 12. The storage means 12 is adapted to store each group of combined signals together with the signal indicating the information content of said group. Accordingly storage means 12 may comprise a conventional plural stage storage register wherein the groups of signals formed by encoding means 11 are stored in predetermined order.

Sampling means 13 is coupled to storage means 12 and is adapted to detect the state assumed by each of the signals that indicate the information content of an associated group. It is understood therefore, that since the groups of signals are stored in predetermined order, sampling means 13 may be connected to preselected ones of the stages of storage means 12. Alternatively sampling means 13 may serially scan each of the stages of storage means 12 and may be activated at predetermined times to sample the state of the signals stored in predetermined stages. Sampling means 13 may comprise a conventional sampling device such as a comparison circuit, a conventional sample and hold network, a gating circuit or the like. The sampling means 13 is coupled to shift control means 14 which in turn is coupled to transmitting means 15. Shift control means 14 is adapted to respond to the state of the signal detected by sampling means 13 such that if the detected state corresponds to the aforementioned first state the group of combined signals associated with the sampled signal is applied to transmitting means 15. Conversely, if the detected state corresponds to the aforementioned second state, shift control means 14 is effective to inhibit the transfer of the group of combined signals associated with the sampled signal to transmitting means 15. Thus only those groups of combined signals containing non-redundant information are transferred to transmitting means 15. Shift control means 14 may comprise conventional gating means well known to those of ordinary skill in the art. It is herein noted that if storage means 12 includes a conventional shift register such that the signals stored in the plural stages therein are serially applied to transmitting means 15, sampling means 13 may be coupled to the first stage of the shift register so as to sample each signal serially stored in said first stage at predetermined intervals of time. In addition shift control means 14 may be deactivated by the sampling means 13 at each sampling time such that the sampled signal is not shifted into transmitting means 15. Consequently transmitting means 15 will receive groups of signals containing non-redundant information but will not receive the signal indicating the presence of non-redundant information in said group.

Transmitting means 15 is adapted to apply the groups of signals received from storage means 12 to the communication channel 17. If the groups of signals are to be serially transmitted over the communication channel 17, transmitting means 15 may include storage means such as a plural stage shift register for storing the groups of signals to be transmitted and for serially transmitting said stored groups of signals. Alternatively, if the groups of signals are to be transmitted simultaneously, i.e., in parallel form, over communication channel 17, transmitting means 15 may include a storage means such as a buffer storage register well known to those of ordinary skill in the art. In addition, transmitting means 15 may include multiplex means for transmitting the groups of combined signals in multiplex form over communication channel 17. It should be understood that the transmitting means 15 includes modulating means for modifying the characteristics of the groups of signals so as to be compatible with the particular communication channel utilized. Hence if communication channel 17 comprises a conventional telephone line, transmitting means 15 may include a modem, well known to the prior art. Similarly if communication channel 17 comprises a radio link, transmitting means 15 may include modulating means consistent with said radio link. The communication channel 17 is adapted to interconnect a transmitting station and a receiving station. It is recognized however that if the transmitting and receiving stations are disposed at the same location, transmitting means 15 may not include additional modulating means and the groups of signals received from storage means 12 may be applied directly to the communication channel 17.

The apparatus comprising the transmitting station illustrated in FIG. 1 is adapted to be controlled in predetermined timed relationship. Accordingly sequence determining means 16 is coupled to sampling means 13 and to shift control means 14 so as to activate the aforementioned means at proper intervals of time. Sequence determining means 16 may comprise a conventional resettable timing network such as a shift register, a counter or the like, adapted to respond to a serial stream of timing signals applied thereto.

Figure 2:
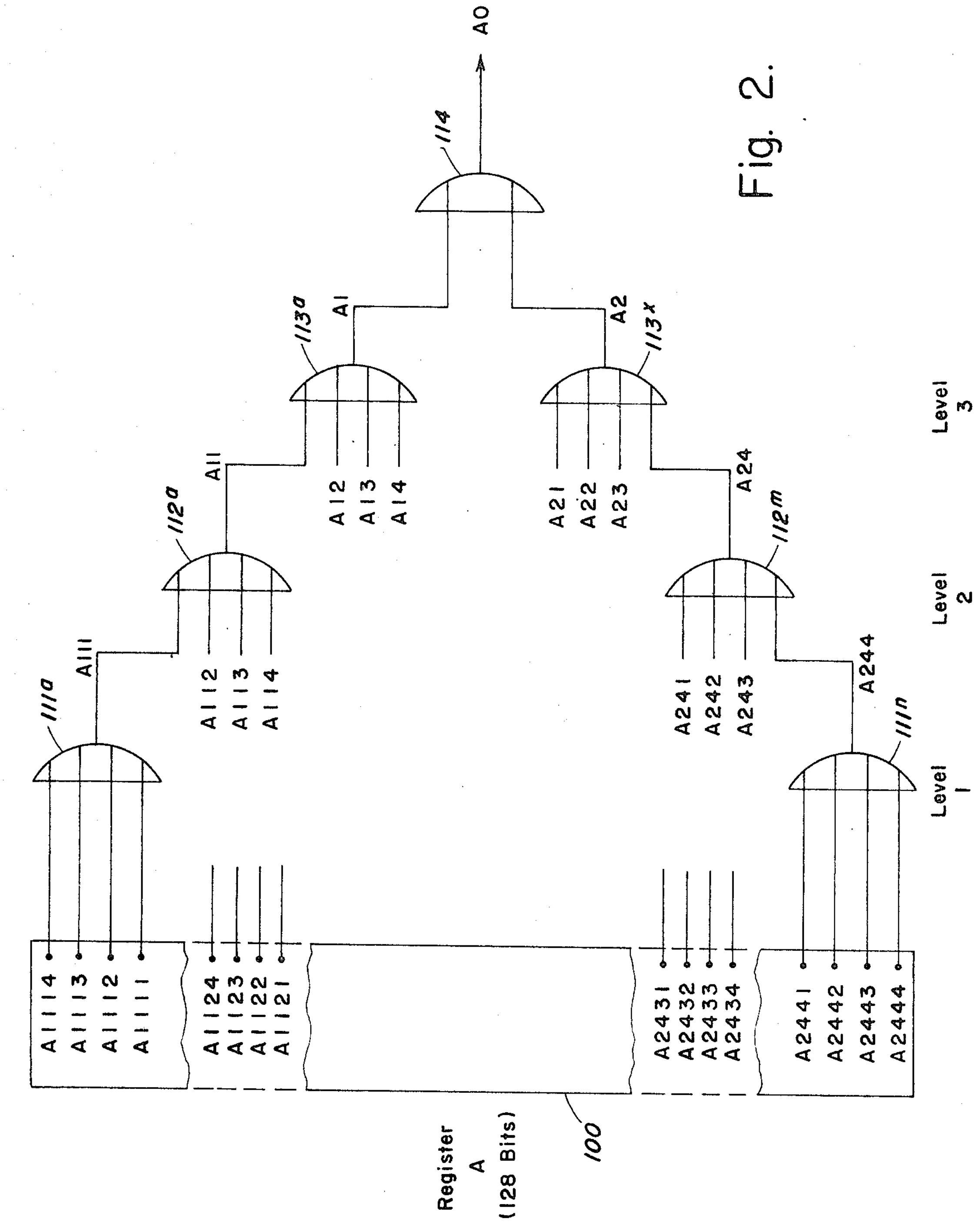
FIG. 2 is a logic diagram of the encoding means that may be utilized in FIG. 1.

To facilitate the understanding of the operation of the apparatus illustrated in FIG. 1, a contemplated embodiment of encoding means 11 will be described. Turning now to FIG. 2 there is illustrated one such embodiment of encoding means 11 comprising an array of combining means 111 . . . 114. Each of the combining means is provided with a plurality of input terminals and a single output terminal such that a signal admitting of the aforementioned first state is generated at said output terminal if at least one of the signals applied to the plurality of input terminals admits of said first state. Accordingly, each of the combining means 111 . . . 114 may comprise a conventional OR-circuit. For purpose of explanation, the encoding means illustrated in FIG. 2 will be described with reference to binary signals such that the aforementioned first state corresponds to a binary "1", and the aforementioned second state corresponds to a binary "0". It is to be understood however that the foregoing assumption should not be interpreted as limiting the present invention thereto. For example, a signal admitting of a first state may correspond to a binary "0" and a signal admitting of a second state may correspond to a binary "1". Furthermore, said signal admitting of a first state may correspond to a black video signal and said signal admitting of a second state may correspond to a white video signal; the converse of this might also apply.

The OR-circuits are ranged in a plurality of columns, each column corresponding to a level of combination as will soon be understood. The first column or level of OR-circuits is comprised of a plurality of OR-circuits **111*a* . . . 111*n*. The second column or level of OR-circuits is comprised of a plurality of OR-circuits 112*a* . . . 112*m* wherein the number of OR-circuits in the second column or level is less than the number of OR-circuits in the immediately preceding column or level. The remaining columns or levels of OR-circuits are comprised of progressively decreasing numbers of OR-circuits such as 113*a* . . . 113*x* until the last column is comprised of a single OR-circuit 114. The columns or levels of OR-circuits are connected such that the output terminals of a group of OR-circuits of an immediately preceding column or level are connected to the input terminals of a single OR-circuit of an immediately succeeding column or level. Thus the output terminals of OR-circuits 111*a*, 111*b*, 111*c* and 111*d* of the first column or level are connected to the input terminals of OR-circuit 112*a* of the second column or level. Similarly, the output terminals of the OR-circuits 112*a*, 112*b*, 112*c* and 112*d* of the second column or level are connected to the input terminals of OR-circuit 113*a* of the third column or level and the output terminals of each of the OR-circuits of the third column or level (i.e., OR-circuits 113*a* and 113*x*) are connected to the input terminals of OR-circuit 114. The input terminals of the OR-circuits 111*a* . . . 111*n*** comprising the first column or level are supplied with information signals such as the distinct bits of a multibit digital word, or video information signals.

The encoding means illustrated in FIG. 2 is adapted to operate on a 128-bit word, which word represents digital information or video information as is now understood. It will soon become apparent that the illustrated encoding means is operable on an *n*-bit word wherein *n* is any number. Accordingly, each OR-circuit **111*a* . . . 111*n* of the first column or level is associated with a group of four bits. Hence the first column or level is comprised of 32 OR-circuits. Each OR-circuit 112*a* . . . 112*m* of the second column or level is associated with a group of four OR-circuits of the next preceding level. Hence the second column or level is comprised of 8 OR-circuits. In a similar manner each of the OR-circuits 113*a* . . . 113*x* of the third column or level is associated with a group of four OR-circuits of the preceding column or level. Thus, the third column or level is comprised of two OR-circuits. It is here noted that although each OR-circuit included in a column is depicted as including four input terminals, the actual number of input terminals is determined only by the number of bits included in a word to be encoded. Furthermore the number of OR-circuits included in each group need not be equal. Thus the input terminals of OR-circuit 112*a* may be coupled to the output terminals of five OR-circuits in the first column or level whereas the input terminals of OR-circuit 112*b*** may be coupled to the output terminals of three OR-circuits included in the first column or level. It is observed that for the encoding of 128 bits, three columns or levels of OR-circuits are provided wherein each column or level is comprised of four times as many OR-circuits as the next succeeding column or level.

The operation of the encoding means illustrated in FIG. 2 will now be described. For purposes of explanation it will be assumed that the encoding means is operable upon a 128-bit word which may represent digital or video information. The 128-bit word may be stored in a conventional storage register such as register 100 illustrated in FIG. 2. The bits stored in register 100 may be supplied thereto by scanning means 10 of FIG. 1. The storage register 100 is comprised of a plurality of stages each of which includes an output terminal connected to a corresponding input terminal of an associated OR-circuit **111*a* . . . 111*n* included in the first column or level. Accordingly, the output terminals of the first four stages of register 100 are coupled to the input terminals of OR-circuit 111*a* and the output terminals of the last four stages of register 100 are coupled to the input terminals of OR-circuit 111*n*. It will be understood that if scanning means 10 is comprised of an array of photosensitive devices, register 100 may be omitted and an output terminal of each photosensitive device may be coupled to an input terminal of a corresponding OR-circuit. In either case each OR-circuit 111*a* . . . 111*n* of the first column or level is supplied with four of the 128-bits. To facilitate the following explanation, the four bits supplied to OR-circuit 111*a* are designated A1111, A1112, A1113 and A1114. If at least one of said four bits is a binary "1" the output signal generated by OR-circuit 111*a* will be a binary "1". Hence the output signal of OR-circuit 111*a*, hereinafter designated A111, is applied to an input terminal of OR-circuit 112***a*. Since the signal A111 is a binary "1", OR-circuit 112*a* generates an output signal, hereinafter A11, that is also a binary "1" irrespective of the values of the remaining input signals A112, A113 and A114 applied thereto. The binary "1" signal applied to OR-circuit 113*a* results in the generation of a binary "1" at the output terminal of said OR-circuit. The signal thus generated by OR-circuit 113*a*, hereinafter A1, is applied to an input terminal of OR-circuit 114 whereupon a binary "1" is produced at the output terminal of OR-circuit 114. Accordingly, the signal generated by OR-circuit 114, hereinafter A0, will be a binary "1" if at least one of the bits stored in register 100 is a binary "1". It will be seen that the signal A0 will be a binary "0" if none of the bits stored in register 100 is a binary "1". If the signals generated by each column or level of OR-circuits are examined, it will be observed that the state of signal A0 is indicative of the information content of the group of signals comprised of signals A1 and A2. That is, if A0 is a binary "1", then the group of signals comprised of A1 and A2 contains non-redundant information, i.e., at least one binary "1". Conversely, if the signal A0 is a binary "0" then the group of signals comprised of A1 and A2 contains redundant information, i.e., A1 and A2 are both binary "0"s. Similarly, the state of the signal A1 is representative of the information content of the group comprised of signals A11, A12, A13 and A14. Hence if signal A1 is a binary "1", then one of the signals A11 – A14 is a binary "1". Conversely, if signal A1 is a binary "0", then none of the signals A11 – A14 is a binary "1". In like manner the signal A11 is representative of the information content of the group of signals comprised of signals A111, A112, A113 and A114. Hence if signal A11 is a binary "1", the group of signals comprised of A111 – A114 contains non-redundant information and at least one of said signals is a binary "1". However if signal A11 is a binary "0", then the group of signals comprised of A111 – A114 contains redundant information and none of said signals is a binary "1". Finally, signal A111 is representative of the information content of the group of signals comprised of bits A1111, A1112, A1113 and A1114. Hence if signal A111 is a binary "1", then the group of signals comprised of bits A1111 – A1114 contains non-redundant information and at least one of said bits is a binary "1". Conversely, if signal A111 is a binary "0" then the said group of signals contains redundant information and none of said bits is a binary "1". For the example assumed hereinabove, that is bit A1111 is a binary "1" and the remaining bits are binary "0"s, it may be observed that signal A111 is a binary "1" indicating that the group of signals comprised of bits A1111 – A1114 contains at least one binary "1". It is understood however that none of the remaining signals generated by the remaining OR-circuits included in the first column or level is a binary "1". Hence only one of the OR-circuits 112*a* of the next succeeding column or level generates a binary "1". Thus it is seen that the signal produced by an OR-circuit is representative of the information content of the group of signals consisting of the signals applied to the input terminals of said OR-circuit.

The encoding means illustrated in FIG. 2 effectively reduces the amount of data needed to transmit the 128-bit word that has been assumed to be 0000 . . . 0001. In fact, only fifteen bits need be transmitted to represent the 128-bit signal; said bits comprising each of the input signals to those OR-circuits generating a binary "1" output signal. Accordingly, signal A0 is transmitted and the input signals to OR-circuit 114, signals A1 and A2, are transmitted because the output signal A0 of OR-circuit 114 is a binary "1". Input signals A11 – A14 of OR-circuit 113*a* are transmitted because output signal A1 is a binary "1". However input signals A21 – A24 of OR-circuit 113x are not transmitted because output signal A2 is a binary "0". Similarly, input signals A111 – A114 of OR-circuit 112*a* are transmitted because the output signal A11 of said OR-circuit is a binary "1". In like manner, bits A1111 – A1114 are transmitted because the output signal A111 generated by OR-circuit 111*a* is a binary "1". Hence the 128-bits stored in register 100 may be represented as 110100010001000 which corresponds, in consecutive order, to signals A0, A1, A2, A11, A12, A13, A14, A111, A112, A113, A114, A1111, A1112, A1113 and A1114. It should now be understood that if a plurality of OR-circuits included in a column or level generate binary "1" output signals the input signals applied to those OR-circuits will be transmitted.

Returning now to the block diagram illustrated in FIG. 1, and more particularly to the transmitting station thereof, the operation of said transmitting station will now be described. Each of the signals generated by the OR-circuits illustrated in FIG. 2 along with each of the signals applied to the input terminals of the OR-circuits illustrated in FIG. 2 are stored in storage means 12. The aforementioned predetermined order in which said signals are stored is inversely related to the columns or levels of OR-circuits. Thus the output signal A0 produced by OR-circuit 114 is stored in a first stage of storage means 12 followed by the input signals A1 and A2 of OR-circuit 114. The next succeeding stages are effective to store output signal A1 of OR-circuit 113*a* followed by the input signals A11 – A11 of OR-circuit 113*a*. The next succeeding stages store the output signal A2 of OR-circuit 113*x* followed by the input signals A21 – A24 of said OR-circuit 113*x*. The remaining stages of storage means 12 store in consecutive order the output signal followed by the input signals of each of the OR-circuits of the second column or level and the output signal followed by the input signals of each of the OR-circuits included in the first column or level. Thus it is seen that the information bits, herein represented as the 128-bits stored in register 100, are stored in the final 160 stages of storage means 12. The capacity of storage means 12 must therefore be at least equal to 213 bits which corresponds to the 128-bits applied to the OR-circuits included in the first column or level plus the 32 signals generated by the OR-circuits included in the first column or level, plus the 32 input signals applied to the input terminals of the OR-circuits included in the second column or level, plus the 8 signals generated by the OR-circuits included in the second column or level, plus the 8 input signals applied to the input terminals of the OR-circuits included in the third column or level, plus the 2 signals generated by the OR-circuits included in the third column or level plus the 2 signals applied to the input terminals of OR-circuit 114, plus the output signal A0 generated by the OR-circuit 114. The most significant bit stored in storage means 12 corresponds to signal A0 and the least significant bit stored in storage means 12 corresponds to bit A2444.

In view of the preceding discussion, it may be observed that the first signal stored in storage means 12 indicates the information content of the digital word supplied to the encoding means 11 and the fourth signal represents the information content of the first group of signals included in the third column or level of OR-circuits illustrated in FIG. 2. The two intermediate signals correspond to the signals applied to OR-circuit 114. Thereafter, every fifth signal stored in storage means 12 is representative of the information content of a group of signals and the intermediate four consecutive signals comprise a group.

If storage means 12 comprises a conventional shift register, sampling means 13 may be coupled to the first stage thereof such that the state of each signal stored in said first stage may be sampled by sampling means 13 at periodic intervals of time determined by sequence determining means 16. Initially, signal A0 is stored in the first stage of storage means 12 and sequence determining means 16 enables sampling means 13 to detect the state of A0. In addition, sequence determining means 16 enables shift control means 14 to shift the signal A0 out of the first stage of storage means 12 and into transmitting means 15. It will be assumed that transmitting means 15 includes a storage means for storing each of the signals shifted thereto from storage means 12. It is recognized that the signal A0 is transferred to transmitting means 15 irrespective of the state thereof. Accordingly signal A0 is indicative of the information content of the digital word supplied to encoding means 11. That is if A0 is a binary "0" the digital word is comprised exclusively of redundant information, however if A0 is a binary "1" the digital word includes non- non-redundant information. After signal A0 is shifted from storage means 12 to transmitting means 15, the remaining contents of the storage means 12 are advanced one stage. Hence input signal A1 now occupies the first stage of storage means 12. Sequence determining means 16 now inhibits sampling means 13 from sampling the state of the signal stored in the first stage of storage means 12. However, the previously sampled state is stored in sampling means 13 and applied to shift control means 14. If the stored state is a binary "1", shift control means 14, under the control of sequence determining means 16, shifts signals A1 and A2 out of storage means 12 and into transmitting means 15. It is recalled that the signals A1 and A2 correspond to the input signals applied to OR-circuit 114 of FIG. 2. If however, the state stored by sampling means 13 is a binary "0", shift control means 14 is effective to shift the signals A1 and A2 out of storage means 12 but transmitting means 15 is inhibited from storing said signals. In accordance with the previously assumed example, the state stored by sampling means 13 corresponds to the state of signal A0 and is a binary "1". Consequently, transmitting means 15 now stores in consecutive order signals A0, A1 and A2. The signal now occupying the first stage of storage means 12 is representative of the information content of a group of signals of the third level and corresponds to signal A1 which is the output signal generated by OR-circuit 113*a* of the third column or level of OR-circuits illustrated in FIG. 2. Sampling means 13 is enabled by sequence determining means 16 to sample the state of signal A1 now stored in the first stage of storage means 12. In addition shift control means 14 is enabled by sequence determining means 16 to shift the signal A1 out of storage means 12 but transmitting means 15 is inhibited from receiving said signal. If the state of the signal A1 is a binary "1", sampling means 13 activates shift control means 14 such that the group of signals A11 – A14 are shifted from storage means 12 to transmitting means 15. However if the sampled state of A1 is a binary "0", shift control means 14 is effective to shift the group of signals A11 – A14 out of storage means 12 but transmitting means 15 is inhibited from receiving said signals. In accordance with the previously assumed example, signal A1 is a binary "1" and the signals A11 – A14 are shifted into transmitting means 15. It should be understood that sequence determining means 16 inhibits sampling means 13 from further sampling of the state of the signal stored in the first stage of storage means 12 until shift control means 14 has shifted signal A14 out of storage means 12.

After the group of signals A11 – A14 has been shifted out of storage means 12, the first stage of said storage means is occupied by a signal representative of the information content of another group of signals of the third level, which corresponds to the output signal A2 generated by O-R-circuit 113*x* of the third column or level of OR-circuits illustrated in FIG. 2. Sampling means 13 samples the state of signal A2 and shift control means 14 shifts the signal A2 out of storage means 12 under the control of sequence determining means 16. In accordance with the previously assumed example, sampling means 13 has detected a binary "0" and therefore, shift control means 14 is effective to shift the group of signals comprised of A21 – A24, which corresponds to the input signals applied to OR-circuit 113*x* of the third column or level of OR-circuits, out of storage means 12. Transmitting means 15, however, is inhibited from receiving said shifted signals. Signal A11, which is representative of the information content of a group of signals of the second level and corresponds to the output signal of OR-circuit 112*a* of the second column or level of OR-circuits illustrated in FIG. 2, now occupies the first stage of storage means 12 and is followed in consecutive order by the group associated therewith comprised of signals A111 – A114. Sampling means 13 is now enabled to sample the signal A11 stored in the first stage of storage means 12 and shift control means 14 is effective to shift signal A11 out of storage means 12. It should now be recognized that shift control means 14 inhibits transmitting means 15 from receiving the shifted signal. Since signal A11 has been assumed to be a binary "1", sampling means 13 activates shift control means 14 to shift the group comprised of signals A111 – A114 from storage means 12 to transmitting means 15. Signal A12, which is representative of the information content of the next group of signals of the second level, is now stored in the first stage of storage means 12 and is followed, in consecutive order, by the associated next group of signals included in the second column or level of groups of signals illustrated in FIG. 2. Since this group of signals and the remaining groups of signals included in the second column or level illustrated in FIG. 2 contain redundant information, shift control means 14 responds to the binary "0"s detected by sampling means 13 to inhibit transmitting means 15 from receiving these groups of signals from storage means 12. Accordingly, the aforementioned operation is repeated until the last signal A244 of the last group of signals included in the second column or level of OR-circuits illustrated in FIG. 2 is shifted out of storage means 12. At this time the first stage of storage means 12 is occupied by signal A111, which is representative of the information content of a group of signals of the first level, and corresponds to the output signal generated by OR-circuit **111*a* of the first column or level of OR-circuits. The signal A111 is followed, in consecutive order, by the bits A111 – A114 which correspond to the input signals applied to the OR-circuit 111*a*. Sampling means 13 samples signal A111 stored in the first stage of storage means 12 and shift control means 14 shifts said signal A111 out of storage means 12. In accordance with the previously assumed example, signal A111 is a binary "1" and sampling means 13 is effective to activate shift control means 14 whereby the group comprised of bits A1111 – A1114 is shifted from storage means 12 to transmitting means 15. The remaining groups of signals included in the first column or level of OR-circuits illustrated in FIG. 2 and stored in storage means 12 contain redundant information. Accordingly, the signals representative of the information content of said groups are equal to binary "0"s. Hence shift control means 14 responds to the signals sampled by sampling means 13 to shift the remaining groups of signals out of storage means 12 but to inhibit transmitting means 15** from receiving said shifted signals.

After the last bit A2444 has been shifted from storage means 12, transmitting means 15 stores the data signal represented by 110100010001000. Thus, the 128-bit word applied to encoding means 11 is now represented by a fifteen bit data signal. It should be understood that each group of signals may be shifted out of storage means 12 in serial fashion or, if desired, a group may be shifted out in parallel. Transmitting means 15 transmits the aforementioned data signal to a receiving station over communication channel 17. It is recognized that said aforementioned data signal may be further modulated in a manner compatible with the particular communication channel utilized. Subsequent to the transmission of the last bit of the data signal, transmitting means 15 may transmit a conventional synchronization signal or code to indicate the completion of transmission and to maintain the receiver apparatus in proper synchronism.

The receiving station illustrated in FIG. 1 is adapted to decode the received data signal and to recover the original information signals therefrom. Accordingly the receiving station includes apparatus that is complementary to the apparatus included at the transmitting station and comprises receive storage means 21, store transfer means 22, group storage means 23, sampling means 24, shift control means 25 and sequence determining means 26. Receive storage means 21 is adapted to store in consecutive order each signal of the groups of signals selectively transmitted thereto by transmitting means 15. Accordingly receive storage means 21 may comprise a conventional shift register or the like. Receive storage means 21 is coupled to group storage means 23 via store transfer means 22. Store transfer means 22 is adapted to transfer a signal from receive storage means 21 to group storage means 23 in response to signals applied thereto by shift control means 25. In addition, store transfer means 22 is adapted to generate signals admitting of a predetermined state and to apply said signals to group storage means 23 in response to signals applied to said store transfer means 22 by sequence determining means 26. Accordingly, store transfer means 22 may comprise conventional gating means further described hereinbelow.

Group storage means 23 is coupled to sampling means 24 and may comprise a conventional storage device such as a storage register, a shift register or a plurality of storage registers. Group storage means 23 is adapted to cooperate with store transfer means 22 to reconstruct the groups of signals formed by encoding means 11. Sampling means 24 is similar to aforedescribed sampling means 13 and is adapted to detect the states of the signals stored in group storage means 23 at selected intervals of time as determined by sequence determining means 26. Shift control means 25 is coupled to sampling means 24 and is similar to aforedescribed shift control means 14. The shift control means 25 enables store transfer means 22 to selectively transfer a group of signals from receive storage means 21 to group storage means 23 or to apply generated signals admitting a predetermined state to group storage means 23, in accordance with the state of the signal sampled by sampling means 24. Sequence determining means 26 is similar to aforedescribed sequence determining means 16 and is coupled to storage transfer means 22, sampling means 24 and shift control means 25. The sequence determining means 26 is effective to establish a timed relationship for the operation of said store transfer means 22, said sampling means 24 and said shift control means 25.

The operation of the receiving station illustrated in FIG. 1 will now be described. To facilitate the instant explanation and for the purpose of simplification, the operation of the receiving station will be described with reference to the previously assumed example. However, the assumed example is not intended to limit the present invention as will soon become clear from the teachings set forth herein. Receive storage means 21 receives the signals selectively transmitted thereto by transmitting means 15. It should be recognized that although not shown, receive storage means 21 may include conventional demodulating devices complementary to the modulating devices includable in transmitting means 15. The received signals are stored in receive storage means 21 in consecutive order corresponding to the order in which said signals are transmitted by transmitting means 15. If receives storage means 21 comprises a conventional plural stage register, such as a buffer register or shift register, the first stage thereof stores the signal indicative of the information content of the original digital word. It is recalled that each signal of a selectively transmitted group of signals is representative of the information content of an associated group contained in an immediately preceding column or level. In other words, if aforedescribed signals A1 and A2 are transmitted, signal A1 is representative of the information content of the group comprised of signals A11 – A14 and signal A2 is representative of the information content of the group comprised of signals A21 – A24. Similarly, if the group of signals A11 – A14 is transmitted, signal A11 is representative of the information content of the group comprised of signals A111 – A114, signal A12 is representative of the information content of the group comprised of signals A121 – A124, and so on. Accordingly the next succeeding stages of receive storage means 21 store, in consecutive order, the signals representative of the information contents of the groups contained in successively preceding columns or levels. The final stages of receive storage means 21 will store selectively transmitted groups of bits which contain non-redundant information.

At preselected intervals of time determined by sequence determining means 26, the signal stored in the first stage of receive storage means 21 is transferred to group storage means 23 by store transfer means 22. The remaining signals stored in receive storage means 21 are advanced therein accordingly. The state of the signal now stored in group storage means 23, which signal corresponds to signal A0, is sampled by sampling means 24 at an interval of time determined by sequence determining means 26. If signal A0 is a binary "0", then it is understood that the original information was solely redundant and shift control means 25 activates store transfer means 22 to generate 128 binary "0"s and to apply said binary "0"s to group storage means 23. It is of course obvious that store transfer means 22 will generate a number of binary "0"s corresponding to the number of bits included in a digital word applied to encoder means 11. Hence if the original digital word was comprised of 100 bits and if sampling means 24 detects that signal A0 stored in group storage means 23 is a binary "0", thus indicating that the original 100-bit word did not include non-redundant information, store transfer means 22 generates 100 binary "0"s which are applied to and stored in group storage means 23, thereby reproducing the original digital word.

In accordance with the previously assumed example, signal A0 is a binary "1". Consequently the next stored signals in receive storage means 21 correspond to signals A1 and A2. Sampling means 24 activates shift control means 25 to enable store transfer means 22 to transfer signals A1 and A2 from receive storage means 21 to group storage means 23. In addition, signal A0 previously stored in group storage means 23 is shifted out therefrom and the remaining signals stored in receive storage means 21 are advanced an appropriate number of stages. The state of signal A1 now stored in group storage means 23 is detected by sampling means 24 at an interval of time determined by sequence determining means 26. The signal A1, in accordance with the previously assumed example, is a binary "1" and sampling means 24 activates shift control means 25 to enable store transfer means 22 to transfer the group of signals associated with signal A1 from receive storage means 21 to group storage means 23. One of ordinary skill in the art will recognize that group storage means 23 may admit of sufficient capacity to store signals to be sampled by sampling means 24, and, in addition, signals that are transferred thereto by store transfer means 22. Accordingly group storage means 23 may include a sample storage register for storing the signals to be sampled by sampling means 24 and a group storage register to store each group of signals transferred thereto by store transfer means 22.

After the group comprised of signals A11 – A14 has been stored in group storage means 23, which group is associated with sampled signal A1, sampling means 24 samples the state of the next consecutively stored signal in group storage means 23. Hence signal A2 is next sampled by sampling means 24. Previously sampled signal A1 may be shifted out of group storage means 23 subsequent to the sampling thereof if desired. Signal A2 has been assumed to be a binary "0" which, it is recalled, indicates that the group comprised of signals A21 – A24, which group is associated with signal A2, is comprised of redundant information and, accordingly, was not transmitted to the receiving station by transmitting means 15. Consequently, sampling means 24 activates shift control means 25 which energizes store transfer means 22 to generate four binary "0"s corresponding to the non-transferred signals A21 – A24. It is of course obvious that store transfer means 22 will generate a number of binary "0"s corresponding to the number of signals in the group associated with signal A2. The generated binary "0"s, which now correspond to signals A21 – A24, are applied to group storage means 23 at an interval of time determined by sequence determining means 26. Group storage means 23 now stores the signals A11 – A14 and A21 – A24, which signals represent the information content of associated groups of signals included in an immediately ly preceding column or level. That is, the signals now stored in group storage means 23 correspond to the output signals produced by OR-circuits 112*a* . . . 112*m* included in the second column or level or OR-circuits illustrated in FIG. 2. These signals may now be utilized to regenerate the input signals applied to said OR-circuits.

Sampling means 24 samples the state of signal A11 stored in group storage means 23. Signal A11 has been assumed to be a binary "1" and therefore sampling means 24 activates shift control means 25 to enable store transfer means 22 to transfer the group of signals associated with signal A11 from receive storage means 21 to group storage means 23. Accordingly the signals A111 – A114 are now stored in group storage means 23. Subsequent to the sampling of signal A11, sampling means 24 samples signal A12 stored in group storage means 23. Signal A12 is assumed to be a binary "0" and therefore, sampling means 24 activates shift control means 25 to energize store transfer means 22 such that store transfer means 22 generates a group comprised of four binary "0"s. This group of binary "0"s corresponds to the non-transmitted group comprised of signals A121 – A124 and is applied to group storage means 23. Accordingly, store transfer means 22 reconstructs each non-transmitted group of signals in accordance with each sampled binary "0". The remaining signals A13 . . . A24 stored in group storage means 23 and sampled by sampling means 24 are binary "0"s. Accordingly the groups associated with said binary "0" s contain redundant information and have not been transmitted to the receiving station by transmitting means 15. Therefore store transfer means 22, under the control of shift control means 25, reconstructs each of these non-transmitted groups of signals and applies said groups of signals to group storage means 23. Accordingly, group storage means 23 now stores each group of signals included in the second column or level illustrated in FIG. 2. Hence signals A111 . . . A244, which correspond to the output signals produced by OR-circuits 111*a* . . . 111*n* included in the first column or level of OR-circuits, are stored in group storage means 23. It is recalled that each of these signals is representative of the information content of an associated group of bits, which bits are included in the original 128-bit digital word.

The signals now stored in receive storage means 21 correspond to the selectively transmitted groups of bits. It is recalled however that only the group comprised of bits A1111 – A1114 has been transmitted. Sampling means 24 samples signal A111 stored in group storage means 23. Since signal A111 is a binary "1", shift control means 25 is activated by sampling means 24 to enable store transfer means 22 to transfer the group of bits associated with signal A111 to group storage means 23 from receive storage means 21. Hence bits A1111 – A1114 are stored in group storage means 23. Sampling means 24 then samples, in consecutive order and at selected intervals of time determined by sequence determining means 26, the remaining signals stored in group storage means 23, which remaining signals correspond to the output signals produced by OR-circuits 111*b* . . . 111*n* of the first column or level of OR-circuits illustrated in FIG. 2. Whereas each of these sampled signals is a binary "0" sampling means 24 activates shift control means 25 to energize store transfer means 22 to generate a group of redundant "0" bits associated with each sampled signal and to apply each group of redundant bits to said group storage means 23. Accordingly group storage means 23 now stores in consecutive order the transmitted bits A1111 – A1114 and generated bits A1121 – A2444. Thus it is seen that the original digital word is accurately reconstructed and stored in group storage means 23.

It should be understood that the foregoing example is not intended to limit the present invention. Accordingly, the number of bits in the original digital word should not be restricted to any arbitrary number and the digital word may admit of any convenient length. Furthermore, storage means 12 included at the transmitting station of FIG. 1 may be omitted and sampling means 13 may comprise a conventional gating network coupled to each output and input terminal of the OR-circuits illustrated in FIG. 2. Furthermore the number of columns or levels of OR-circuits illustrated in FIG. 2 should not be arbitrarily limited to the three columns or levels described with reference to the foregoing example. It should be noted that the number of columns or levels of OR-circuits and the number of input terminals of each OR-circuit should be sufficient to accommodate the number of bits included in the digital word to be encoded. In addition, transmitting means 15 may be adapted to serially transmit the encoded data signals or if desired, transmitting means 15 may transmit said data signals in parallel form.

At the receiving station the signals stored in receive storage means 21 may be serially transferred to group storage means 23 or if desired, said signals may be transferred in parallel form. Furthermore, sampling means 24 may be adapted to serially sample each signal stored in group storage means 23, which signal represents the information content of an associated group of signals, or alternatively, sampling means 24 may comprise a conventional gating network for sampling in parallel form the signals representative of the information contents of the groups of signals included in a given column or level.

To summarize the operation of the apparatus of the present invention represented by the block diagram of FIG. 1, encoding means 11 responds to a multibit digital word, which word represents digital or video information, so as to form a plurality of levels of groups of combined signals such that a given level includes a greater number of groups than an immediately succeeding level. The contents of each group of signals included in each level are examined for non-redundant information by sampling means 13 in cooperation with shift control means 14. Those groups of signals containing non-redundant information are transmitted by transmitting means 15 to a receiving station. Each signal of a received group of signals is utilized by sampling means 24 in cooperation with shift control means 25 and store transfer means 22 to reconstruct the non-transmitted groups of signals in a level by level sequential manner. It is now seen that the apparatus thus far described substantially reduces the number of data signals that must be transmitted to represent highly redundant information. In fact, a 128-bit word comprised exclusively of binary "0"s may be represented by a single binary "0". Similarly, the video signals representing a scanned white area may be represented by a single binary "0". In the example described hereinabove, a 128-bit digital word was represented by 15 data bits. It is of course obvious that as the information density of original information signals increases the number of data bits necessary to represent that information correspondingly increases. One of ordinary skill in the art will realize that a 128-bit digital word having an extremely high information density will be represented by a data word having 171-bits. The present invention therefore, is particularly advantageous in reducing the amount of data necessary to represent highly redundant information. Consequently, the present invention is readily applicable for the transmission of facsimile information.

Figure 3:
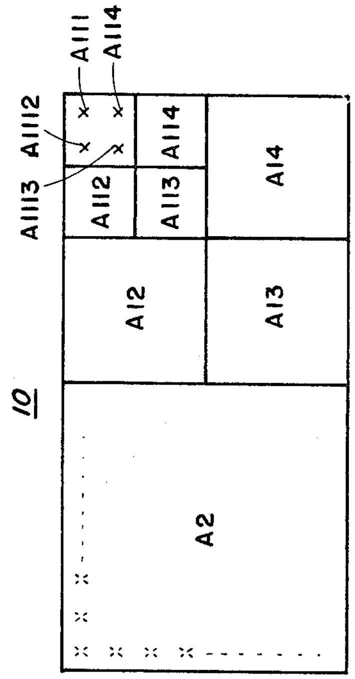
FIG. 3 is a diagrammatic representation of a device that may be utilized with the apparatus of FIG. 1.

As illustrated in FIG. 1, the information signals supplied to encoding means 11 may be provided by scanning means 10. A conventional scanning means that may be utilized in a facsimile transmission system may comprise an array of photosensitive devices such as photodiodes, phototransistors or the like. A diagrammatic representation of such an array is illustrated in FIG. 3. The area defined by the array of photosensitive devices may be divided into a plurality of portions of successively decreasing size such that each given portion is comprised of a summation of the next smallest portions and the area is comprised of the summation of the largest portions. Thus, as illustrated herein, the total area, which may be represented by the designation A0, may be divided into two portions A1 and A2 such that the sum of the portions A1 and A2 is equal to the area A0. Each of the largest portions A1 and A2 may be further subdivided into a plurality of smaller portions. As illustrated herein, portion A1 is subdivided into four equal portions A11, A12, A13 and A14, the summation of which is equal to the largest portion A1. Each of these next smaller portions may be further subdivided into portions such as A111, A112, A113 and A114 wherein the summation of these next smaller portions is equal to the portion designated A11. It is understood that further subdivision is contemplated until a smallest portion is obtained, which smallest portion is comprised of a plurality of the photosensitive devices. As shown in FIG. 3 a smallest portion designated A111 is comprised of four photosensitive devices designated A1111, A1112, A1113 and A1114, respectively. One of ordinary skill in the art will appreciate that each of the photosensitive devices is adapted to produce a binary "1" upon detecting a black region and to produce a binary "0" upon detecting a white region. Hence if the scanning means 10 is utilized in a facsimile transmission system, the array of photosensitive devices is effective to selectively produce binary "1"s and "0"s in accordance with the information recorded on a document.

The area defined by the array of photosensitive devices has been divided into a plurality of portions of successively decreasing size as shown in FIG. 3 to indicate how the present invention may be advantageously utilized therewith. Each photosensitive device may be coupled to a corresponding stage of register 100 illustrated in FIG. 2 so that the register 100 may store a digital word representing the video information detected by scanning means 10. Alternatively, the register 100 may be omitted and each photosensitive device may be coupled to the input terminal of a corresponding OR-circuit 111a . . . 111n. Hence each of the photosensitive devices included in portion A111 may be coupled to the input terminals of OR-circuit 111a, each of the photosensitive devices included in portion A112 may be coupled to the input terminals of OR-circuit 111b and so on. It may now be seen that if the area scanned by the array of photosensitive devices does not contain non-redundant information each of the photosensitive devices will produce a binary "0" corresponding to a detected white region. Hence signal A0 produced by OR-circuit 114 of FIG. 2 will be a binary "0". However if the area scanned by the array of photosensitive devices contains non-redundant information, at least one of said photosensitive devices will generate a binary "1". Accordingly, signal A0 produced by OR-circuit 114 of FIG. 2 will be a binary "1" indicating the presence of non-redundant information. If said non-redundant information, i.e., the detected black region, is contained in the portion designated A1, then the signal A1 produced by OR-circuit 113a of FIG. 2 will be a binary "1". Similarly, if the detected black region resides in portion A2, signal A2 of FIG. 2 will be a binary "1". If the detected black region resides in portion A1, the particular position therein is further indicated by signals A11 – A14. That is, if the detected black region resides in portion A11, the signal A11 produced by OR-circuit 112a of FIG. 2 will be a binary "1". It is of course recognized that an additional black region may reside in portion A1 such as in portion A13. In such case both signals A11 and A13 will be binary "1"s. Assuming that the black region occupies portion A11, the localized position thereof may be indicated by signals A111 – A114. Hence if signal A111 is a binary "1" it may be concluded that one of the photosensitive devices A1111 – A1114 has detected a black region. In like manner, if signal A112 is a binary "1", it may be concluded that at least one of the photosensitive devices included in portion A112 has detected a black region. It is now appreciated that an area scanned by an array of photosensitive devices such as illustrated in FIG. 3 may be divided into a plurality of portions of successively decreasing size in the manner hereinbefore described by the encoding means illustrated in FIG. 2. Thus only those data signals necessary to ascertain the particular position of detected black regions within a scanned area need be transmitted.

Reconstruction of the original video information may be implemented in the manner now described. If a received signal A0 is a binary "1" it is understood that at least one black region is disposed in either portion A1 or A2. If signal A1 is a binary "1", and signal A2 is a binary "0" then it is concluded that the detected black regions reside somewhere in the smaller portions comprising portion A1 and no black regions reside in portion A2. Conversely, if signal A1 is a binary "0" and signal A2 is a binary "1", then the black regions reside somewhere in the smaller portions comprising portion A2 and portion A1 does not contain any black regions. Assuming that received signal A11 is a binary "1" it is determined that the black regions reside somewhere in the smaller portions comprising portion A11. And if signal A111 is a binary "1" it is known that at least one of the photosensitive devices included in portion A111 has detected a black region. It is recalled that if signal A111 is a binary "1" then signals A1111 – A1114 will be received, whereby the signals produced by photosensitive devices A1111 – A1114 may be accurately reproduced. Hence, each received group of signals serves to partition a scanned area into its several components so that the detected black regions may be localized.

The foregoing explanation is applicable to the transmission and reception of data signals representing information signals containing more than a single detected black region. If a plurality of black regions is detected the encoding means illustrated in FIG. 2 will produce signals corresponding to those portions within which the detected black regions reside. Thus, it is seen that the present invention is effective to eliminate redundant signals inherent in facsimile transmission and to transmit data compressed signals representing scanned information. It is to be understood that the array of photosensitive devices illustrated in FIG. 3 is merely exemplary. Accordingly the array may assume a rectangular configuration, a square configuration, or any other suitable geometric configuration. In addition the number of smaller portions comprising a next larger portion may be any convenient number.

Figure 4:
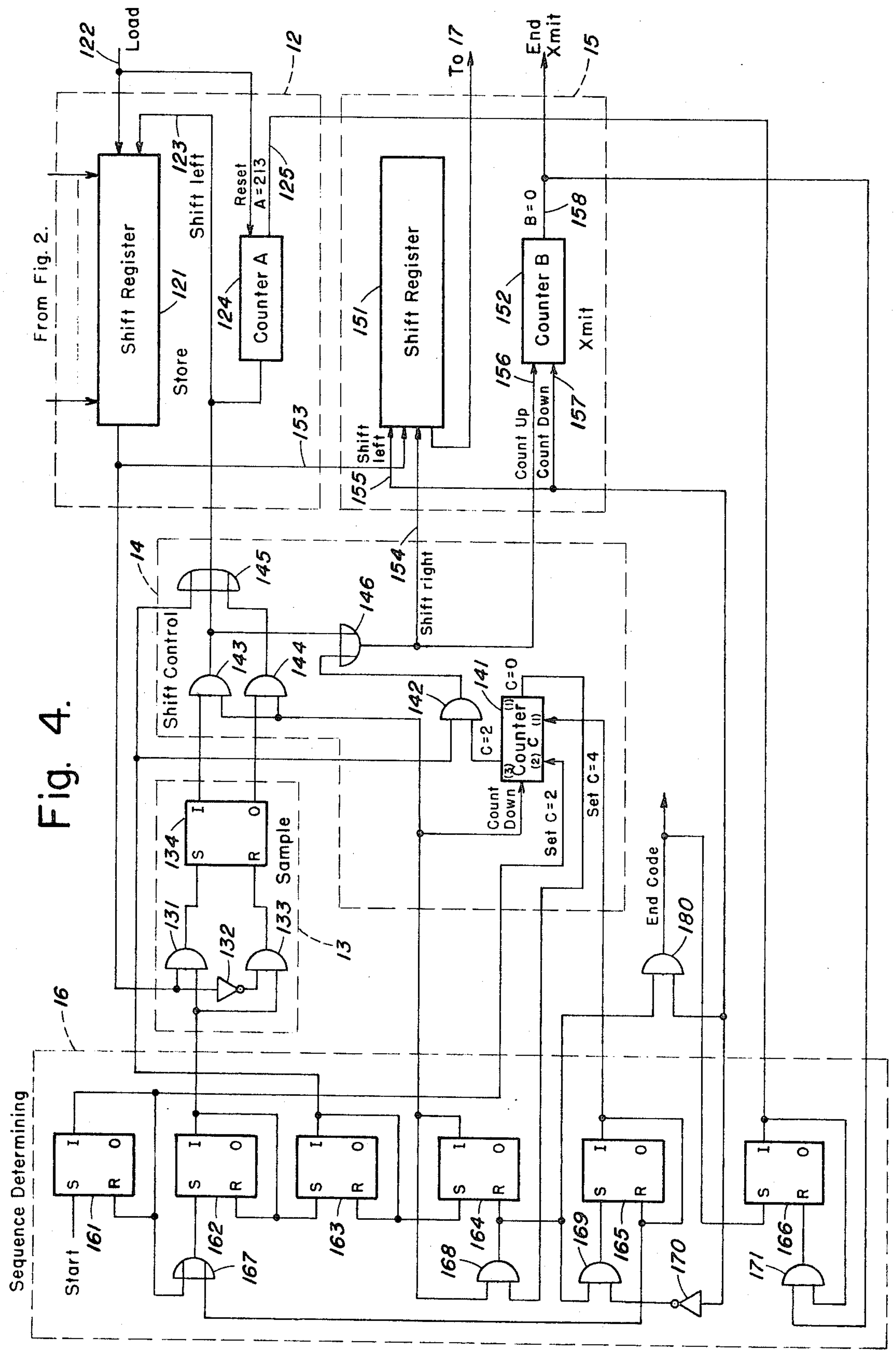
FIG. 4 is a logic diagram of a data compression transmitting system in accordance with the present invention.

Referring now to FIG. 4, there is illustrated a logic circuit diagram of the transmitting station of the present invention and comprises storage means 12, sampling means 13, shift control means 14, transmitting means 15 and sequence determining means 16. Storage means 12 is comprised of a plural stage shift register 121 and counter means 124. The shift register 121 is adapted to store a plurality of bits applied thereto in parallel relationship by the encoding means illustrated in FIG. 2. Counter means 124, is adapted to be reset to a zero count upon the loading of shift register 121. Accordingly a load enable lead 122 is coupled to shift register 121 and to counter means 124. A signal applied to load enable lead 122 is effective to permit the loading of shift register 121 with bits applied thereto. Shift register 121 may include conventional gating circuitry. The counter means 124 is adapted to count the number of bits shifted out of shift register 121 and to indicate when the last bit stored in shift register 121 is shifted out therefrom. Accordingly a lead 123 is coupled to shift register 121 and to counter means 124. A pulse applied to lead 123 is effective to shift the contents of shift register 121 one stage to the left and to increment the count of counter means 124 by a count of one.

The output terminal of the leftmost stage of shift register 121, i.e., the most significant bit position, is coupled to sampling means 13. Sampling means 13 is comprised of coincidence detecting means 131 and 133 and storage means 134. Coincidence detecting means 131 may comprise a conventional AND gate whereby a binary "1" is produced at the output terminal thereof when a binary "1" is applied to each input terminal thereof. A first input terminal of coincidence means 131 is coupled to the first stage of shift register 121 and a second input terminal of coincidence means 131 is coupled to sequence determining means 16. Hence, coincidence means 131 is capable of detecting a binary "1" stored in the first stage of shift register 121. Coincidence means 133 is similar to aforementioned coincidence means 131 and includes a first input terminal coupled to the first stage of shift register 121 via inverting means 132. Coincidence means 133 is capable of detecting a binary "0" stored in the first stage of shift register 121. Inverting means 132 may comprise a conventional logic negation circuit for inverting the sense of an applied binary signal. Hence inverting means 132 produces a binary "1" when the input terminal thereof is supplied with a binary "0". Conversely, a binary "0" is produced by inverting means 132 when the input terminal thereof is supplied with a binary "1". Storage means 134 may comprise a conventional flip-flop circuit including set and reset input terminals and 1 and 0 output terminals. As is understood, if a binary "1" is applied to the set input terminal of flip-flop 134 a binary "1" is produced at the 1 output terminal thereof. Similarly, if a binary "1" is applied to the reset input terminal a binary "1" is produced at the 0 output terminal of flip-flop 134. Accordingly flip-flop 134 is adapted to store a binary "1" or a binary "0" in accordance with the activation of the set or reset input terminals thereof respectively. The flip-flop 134 may comprise a conventional R–S flip-flop circuit, a J–K flip-flop circuit or a timing pulse controlled flip-flop circuit.

The 1 and 0 output terminals of flip-flop 134 are coupled to shift control means 14 which comprises coincidence means 143 and 144, OR-circuits 145 and 146 and counting means 141. Coincidence means 143 and 144 are similar to aforedescribed coincidence means 131 and 133 and include first input terminals connected to the 1 and 0 output terminals of flip-flop 134 respectively, and second input terminals connected in common relationship to sequence determining means 16. Coincidence means 143 is coupled to an input terminal of OR-circuit 145 and, in addition, to an input terminal of OR-circuit 146. Coincidence means 144 is also coupled to an input terminal of OR-circuit 145. If flip-flop 134 stores a binary "1", coincidence means 143 is adapted to apply a binary "1" to OR-circuits 145 and 146 at predetermined intervals of time as determined by sequence determining means 16. Similarly if a binary "0" is stored by flip-flop 134, coincidence means 144 is adapted to apply a binary " 1" to OR-circuit 145 at the aforementioned predetermined intervals of time. The output terminal of OR-circuit 145 is coupled to lead 123 and therefore, is effective to shift the contents of shift register 121 one stage to the left and to increment the count of the counter means 124. The output terminal of OR-circuit 146 is coupled to transmitting means 15 for a purpose soon to be described.

Counter means 141 is adapted to count the number of bits shifted out of shift register 121 and to indicate when a predetermined number of said bits have been so shifted. Accordingly, counter means 141 is capable of indicating when a group of signals has been shifted out of shift register 121. Counter means 141 may comprise a conventional binary counter whose count is decremented upon the application thereto of a counting pulse signal. Alternatively, counter 141 may be a binary counter whose count is incremented by the application of a counting pulse. In either case, counter means 141 responds to a number of counting pulses corresponding to the number of signals included in a group of signals. In accordance with the previously assumed example, counter means 141 may comprise a countdown counter capable of counting from four to zero. Accordingly counter means 141 may include a first input terminal coupled to sequence determining means 16, whereby a signal applied to said first input terminal is effective to set the count of counter means 141 to a count of four. Counter means 141 may include a second input terminal coupled to sequence determining means 16 whereby a signal applied to said second input terminal is effective to set the count of counter means 141 to a count of two. Furthermore, counter means 141 may include an enable input terminal coupled to sequence determining means 16, whereby a signal applied to said enable input terminal is effective to enable counter means 141 to decrement the count thereof in response to applied counting pulses. A first output terminal of counter means 141 is coupled to sequence determining means 16 and is adapted to provide a signal thereat when the count of counter means 141 has been decremented to a count of zero. The counter means 141 includes a second output terminal for providing a signal when the count obtained by counter means 141 is equal to two.

Coincidence means 142, which may be similar to aforedescribed coincidence means 143, includes a first input terminal connected to the second output terminal of counter means 141 and a second input terminal connected to sequence determining means 16. The output terminal of coincidence means 142 is connected to an input terminal of OR-circuit 146. The coincidence means 142 is adapted to supply a binary "1" to OR-circuit 146 when counter 141 obtains a count of two at selected intervals of time.

Transmitting means 15 is comprised of shift register 151 and counter means 152. Shift register 151 may comprise a conventional plural stage shift register capable of shifting the contents thereof in either direction. The shift register 151 is adapted to receive bits serially applied thereto from shift register 121 via lead 153. The bits applied to shift register 151 may be sequentially shifted therethrough in response to timing pulses applied to the shift register. The shift register 151 preferably includes an activating terminal to which lead 154 is coupled. A signal applied to lead 154 is effective to activate shift register 151 so that the bits supplied thereto by lead 153 may be serially shifted in one direction in response to applied timing pulses. Lead 154 is coupled to the output terminal of OR-circuit 146. The shift register 151 may include a further energizing terminal coupled to lead 155 such that the signal applied to said additional energizing terminal actuates shift register 151 to serially shift the contents of the plural stages thereof in an opposite direction in response to applied timing pulses. Lead 155 is coupled to sequence determining means 16.

Counter means 152 may comprise a conventional binary up-down counter that is responsive to timing pulses applied thereto. Counter means 152 includes a first input terminal coupled to lead 156 such that a signal applied to lead 156 is effective to enable counter means 152 to increment the count thereof in response to applied timing pulses. In addition counter means 152 includes a second input terminal coupled to lead 157 whereby a signal applied to lead 157 activates counter means 152 to decrement the count thereof in response to timing pulses. Lead 156 is coupled in common relationship with lead 154 to the output terminal of OR-circuit 146. Lead 157 is coupled in common relationship with lead 155 to sequence determining means 16. It may be observed therefore that counter means 152 is adapted to provide a count corresponding to the number of bits stored in shift register 151 and may be decremented to a count of zero when the last bit stored in shift register 151 is shifted out therefrom. An output terminal of counter means 152 may be provided with a signal indicating that the count obtained by counter means 152 is equal to zero. Lead 158 couples the output terminal of counter means 152 to sequence determining means 16.

Sequence determining means 16 is adapted to activate sampling means 13, shift control means 14 and transmitting means 15 at selected intervals of time. Accordingly sequence determining means 16 may comprise a conventional timing network including flip-flops 161–166, OR-circuit 167 and coincidence means 168, 169 and 171. Each of flip-flops 161–166 may be similar to aforedescribed flip-flop 134, and therefore may comprise a timing pulse controlled flip-flop. Accordingly each of said flip-flops 161–166 may be provided with a timing pulse from a source of timing pulses not shown. Each of said flip-flops 161–166 is adapted to provide a binary "1" at the 1 output terminal thereof in response to a binary "1" applied to the set input terminal thereof; and similarly, a binary "0" is provided at the 1 output terminal thereof in response to a binary "1" supplied to the reset input terminal thereof. It will be assumed, for purposes of explanation, that each of the flip-flops 161–166 is responsive to an input signal applied thereto during the first half cycle of each timing pulse period. As illustrated herein, the 1 output terminal of flip-flop 161 is coupled to the reset input terminal thereof and in addition, to the set input terminal of flip-flop 162 via OR-circuit 167. Furthermore the 1 output terminal of flip-flop 161 is coupled to the second input terminal of counter means 141. The set input terminal of flip-flop 161 is adapted to be supplied with a start signal which may be generated by conventional means such as by the closing of a start operation switch.

The 1 output terminal of flip-flop 162 is coupled in common relationship to the reset input terminal thereof and to the set input terminal of flip-flop 163. In addition, the 1 output terminal of flip-flop 162 is coupled to the common connected input terminals of coincidence means 131 and 133. The 1 output terminal of flip-flop 163 is coupled in common relationship to the reset input terminal of said flip-flop and to the set input terminal of flip-flop 164. Furthermore said 1 output terminal is connected in common to an input terminal of coincidence means 142 and to an input terminal of OR-circuit 145.

Flip-flop 164 includes a 1 output terminal that is coupled to the common connected input terminals of coincidence means 143 and 144 and in addition to the third input terminal of counter means 141. The 1 output terminal of flip-flop 164 is also coupled to the reset input terminal of flip-flop 164 via coincidence means 168. A second input terminal of coincidence means 168 is coupled to the first output terminal of counter means 141. The output terminal of coincidence means 168 is coupled in common relationship to the reset input terminal of flip-flop 164, to an input terminal of coincidence means 169 and to an input terminal of coincidence means 180. The second input terminal of coincidence means 169 is connected via inverting circuit 170 to the second input terminal of coincidence means 180 which in turn is connected to lead 125. Inverting means 170 is similar to aforedescribed inverting means 132 and need not be further explained herein. Coincidence means 180 is adapted to generated a signal at the output terminal thereof when the last bit stored in shift register 121 has been shifted out therefrom. The output terminal of coincidence means 180 is coupled to the set input terminal of flip-flop 166. The 1 output terminal of aforementioned flip-flop 165 is connected in common relationship to the reset input terminal thereof, to the first input terminal of counter means 141 and to an input terminal of OR-circuit 167. The 1 output terminal of flip-flop 166 is connected in common relationship to leads 155 and 157 and in addition, to the reset input terminal of flip-flop 166 via coincidence means 171. A second input terminal of coincidence means 171 is connected to lead 158.

The operation of the apparatus represented by the logic circuit diagram of FIG. 4 will now be described. Each of the signals generated by the OR-circuits of FIG. 2 is stored in consecutive order in the plural stages of shift register 121 in response to a load signal applied to lead 122. The signals are stored in a column by column (or level by level) order such that the output signal followed by the input signals of each OR-circuit are stored. Accordingly the signals stored in the stages of shift register 121, reading from left to right, consist of A0, A1, A2, A1, A11, A12, A13, A14, A2, A21, A22, A23, A24, A11, A111, A112, A113, A114 . . . A2444, irrespective of the state of each signal. It is recognized that when a load signal is applied to lead 122, the count of counter means 124 is reset to a zero count.

It will be assumed that counter means 141 and 152 exhibit a count of zero at this time and, in addition, a binary "0" is stored in each stage of shift register 151 and flip-flops 161-166 have been reset so that a binary "0" is provided at the 1 output terminal of each of said flip-flops. As aforementioned, each of shift registers 121 and 151, counters 124, 141 and 152, and flip-flops 134 and 161–166 are responsive to timing pulses applied thereto. However in an effort to avoid the addition of unnecessary complexities to the logic circuit diagram illustrated in FIG. 4, a source of timing pulses and the interconnections between said source and the timing pulse responsive devices have not been shown. Nevertheless, it should be understood that flip-flops 161–166 are responsive to the first half cycle of each timing pulse period and shift registers 121 and 151, counter means 124, 141 and 152, and flip-flop 134 are responsive to the second half cycle of each timing pulse period. This convention is adapted for a purpose soon to become apparent. When a start pulse is applied to the set input terminal of flip-flop 161, such as by closing a start operation switch, a binary "1" is provided at the 1 output terminal of flip-flop 161 upon the first half cycle of a timing pulse period. The binary "1" is applied to the second input terminal of counter means 141 and upon the second half cycle of a timing pulse period counter means 141 is set to a count of two. At the first half cycle of the next timing pulse period the binary "1" provided at the 1 output terminal of flip-flop 161 sets flip-flop 162 to the 1 state thereof and resets flip-flop 161 to the 0 state thereof. Accordingly, a binary "1" is provided at the 1 output terminal of flip-flop 162 which binary "1" is applied to the common connected input terminals of coincidence means 131 and 133.

Coincidence means 131 and 133 are effective to sample the state of the bit stored in the first stage of shift register 121. It is recalled that the bit now stored in this stage corresponds to signal A0. Accordingly if signal A0 is a binary "1", coincidence means 131 responds to the binary "1" supplied to each input terminal thereof to set flip-flop 134 to its 1 state. However, if signal A0 is a binary "0", inverting means 132 inverts the sense of signal A0 so as to apply a binary "1" to the input terminal of coincidence means 133 and coincidence means 133 is effective to reset flip-flop circuit 134 to its 0 state. Accordingly, it may be seen that flip-flop 134 stores the state of the signal occupying the first stage of shift register 121 when flip-flop 162 is set to its 1 state. It is of course understood that flip-flop 134 provides a binary "1" at the 1 output terminal or at the 0 output terminal thereof during the second half cycle of a timing pulse period. At the first half cycle of the next timing pulse period, flip-flop 162 is reset to its 0 state and flip-flop 163 is set to its 1 state. Accordingly, a binary "1" is applied to OR-circuit 145 by the 1 output terminal of flip-flop 163 and OR-circuit 145 applies a binary "1" to lead 123 and to the input terminal of counter means 124. The binary "1" provided at the 1 output terminal of flip-flop 163 is additionally applied to an input terminal of coincidence means 142. Since counter means 141 has been previously set to a count of two, coincidence means 142 is supplied with a binary "1" at each input terminal thereof and therefore, applies a binary "1" to OR-circuit 146. OR-circuit 146 in turn, applies a binary "1" to leads 154 and 156. During the second half cycle of the timing pulse period, shift register 121 responds to the binary "1" applied to lead 123 to shift the contents thereof one stage to the left. Accordingly signal A0 is applied to lead 153 and shift register 151 responds to the second half of said timing pulse period and to the binary "1" applied to lead 154 to shift signal A0 into the first stage thereof. In addition counter means 152 responds to the second half cycle of the timing pulse period and to the binary "1" applied to lead 156 to increment the count thereof by one.

During the first half cycle of the next timing pulse period, flip-flop 163 is reset and flip-flop 164 is set to its 1 state. Accordingly, a binary "1" is applied to an input terminal of each of coincidence means 143 and 144 and in addition, a binary "1" is applied to the third input terminal of counter means 141. If the state of the sampled signal stored by flip-flop 134 corresponds to a binary "1", coincidence means 143 is activated at this time to apply a binary "1" to OR-circuits 145 and 146. Consequently OR-circuit 145 applies a binary "1" to lead 123 and OR-circuit 146 applies a binary "1" to leads 154 and 156. Accordingly during the second half cycle of this timing pulse period, the contents of shift register 121 are shifted one stage to the left and the bit stored in the first stage of shift register 121 is shifted into the first stage of shift register 151. In addition, the contents of shift register 151 are shifted one stage to the right. Furthermore, counter means 124 increments the count thereof as does counter means 152. If however, the state of the sampled signal stored by flip-flop 134 corresponds to a binary "0", coincidence means 144 is activated to apply a binary "1" to OR-circuit 145. OR-circuit 146 will not produce a binary "1" because neither input thereof is supplied with a binary "1" as will soon be seen. Nevertheless, OR-circuit 145 applies a binary "1" to lead 123 such that the contents of shift register 121 are shifted one stage to the left and counter means 124 increments its count. It is noted however that the signal shifted out of the first stage of shift register 121 is not shifted into shift register 151 because lead 154 is not supplied with a binary "1". Thus a sampled binary "0" is effective to prevent the group of signals associated with said sampled binary "0" from being stored in shift register 151.

In accordance with the previously assumed example, signal A0 corresponds to a binary "1" and therefore flip-flop 134 provides a binary "1" at the 1 output terminal thereof, thereby activating coincidence means 143. Accordingly OR-circuit 145 applies a binary "1" to lead 123 and to counter means 124. In addition OR-circuit 146 applies a binary "1" to leads 154 and 156. Consequently, during the second half cycle of the timing pulse period the signal stored in the first stage of shift register 121, which signal corresponds to signal A1 is shifted into the first stage of shift register 151, the contents of shift register 121 are shifted one stage to the left, the count of counter means 154 is incremented, the contents of shift register 151 are shifted one stage to the right, and the count of counter means 152 is incremented. In addition, since the 1 output terminal of flip-flop 164 applies a binary "1" to the third input terminal of counter means 141, the count of counter means 141 is decremented to a count of one.

Since the count of counter means 141 is not equal to zero, coincidence means 168 is provided with but a single binary "1" at an input terminal thereof. Hence coincidence means 168 applies a binary "0" to the reset input terminal of flip-flop 164 and therefore, during the first half cycle of the next timing pulse period, flip-flop 164 remains in its set state. Accordingly the foregoing operation is repeated such that signal A2 is shifted from the first stage of shift register 121 to the first stage of shift register 151, the contents of shift register 121 are shifted one stage to the left, the count of counter means 124 is incremented, the contents of shift register 151 are shifted one stage to the right, and the count of counter means 152 is incremented. In addition the count of counter means 141 is decremented to a count equal to zero.

At this time the signals stored in consecutive order in shift register 121 consist of A1, A11, A12, A13, A14, A2, A21, A22, A23, A24, A11, A111, A112, A113, A114 . . . A2444, and the signals stored in consecutive order in shift register 151 consist of A0, A1, A2. Since counter means 141 has attained a count of zero, coincidence means 168 is provided with a binary "1" at each input terminal thereof and therefore, applies a binary "1" to the reset input terminal of flip-flop 164 and to an input terminal of coincidence means 169. Whereas the count of counter means 124 has not as yet been incremented to a count of 213 (which it is recognized is equal to the number of bits originally stored in shift register 121), lead 125 applies a binary "0" to inverter means 170. Consequently, coincidence means 169 is supplied with a binary "1" at each input terminal thereof and therefore, applies a binary "1" to the set input terminal of flip-flop 165. Hence, during the first half cycle of the next timing pulse period flip-flop 164 is reset and flip-flop 165 is set. Consequently the 1 output terminal of flip-flop 165 applies a binary "1" to the first input terminal of counter means 141 and in addition a binary "1" to an input terminal of OR-circuit 167. At the second half cycle of the timing pulse period the count of counter means 141 is set equal to four. It is noted that at this time sequence determining means 16 does not supply a binary "1" to any of the remaining circuitry illustrated in FIG. 4. Thus none of the operations described hereinabove is performed.

Since the 1 output terminal of flip-flop 165 applies a binary "1" to the reset input terminal thereof and to an input terminal of OR-circuit 167, it is understood that during the first half cycle of the next timing pulse period flip-flop 165 is reset and flip-flop 162 is set. Accordingly, a binary "1" is applied to the common connected input terminals of coincidence means 131 and 133. Hence the state of the signal occupying the first stage of shift register 121 may be sampled. It should be appreciated that the signal now occupying said first stage of shift register 121 corresponds to signal A1 which is representative of the information content of a group of signals and, in accordance with the previously assumed example, is a binary "1". Accordingly, coincidence means 131 applies a binary "1" to the set input terminal of flip-flop 134 and, during the second half cycle of the timing pulse period, flip-flop 134 is set to its 1 state. Thus the sampled state of the signal stored in the first stage of shift register 121 is now stored in flip-flop 134. During the first half cycle of the next timing pulse period flip-flop 162 is reset and flip-flop 163 is set to its 1 state. Hence a binary "1" is applied to OR-circuit 145 by the 1 output terminal of flip-flop 163. In addition a binary "1" is applied to an input terminal of coincidence means 142. It should be noted however that counter means 141 exhibits a count equal to four and therefore, the second output terminal of counter means 141 supplies a binary "0" to coincidence means 142.

The binary "1" supplied to OR-circuit 145 is effective to produce a binary "1" on lead 123 and at the input terminal of counter means 124. Consequently during the second half cycle of the timing pulse period signal A1 stored in the first stage of shift register 121 is shifted out therefrom, the contents of shift register 121 are shifted one stage to the left, and the count of counter means 124 is incremented. It is recognized that neither input terminal of OR-circuit 146 is supplied with a binary "1" and therefore lead 154 is provided with a binary "0". Accordingly, the signal A1 shifted out of shift register 121 is not shifted into shift register 151 and therefore, is discarded. The signals now stored in the first four stages of shift register 121 correspond to signals A11–A14 which, it may be observed, comprise the group of signals applied to OR-circuits 113a of FIG. 2. In addition the binary "1" stored in flip-flop 134 indicates that this group of signals contains non-redundant information. Hence during the first half cycle of the next timing pulse period, when flip-flop 163 is reset and flip-flop 164 is set, coincidence means 143 is provided with a binary "1" at each input terminal thereof and OR-circuits 145 and 146 supply binary "1"s to lead 123, to an input terminal of counter means 124 and to leads 154 and 156. A binary "1" is additionally applied to the third input terminal of counter means 141 by the 1 output terminal of flip-flop 164. Consequently, during the second half cycle of the timing pulse period the signal stored in the first stage of shift register 121 is shifted into shift register 151, the contents of shift register 121 are shifted one stage to the left, the count of counter means 124 is incremented, the contents of shift register 151 are shifted one stage to the right, the count of counter means 152 is incremented, and the count of counter means 141 is decremented to a count of three. It should be recognized that the count of three attained by counter means 141 indicates that shift register 121 has stored therein three of the signals of the group of signals associated with the sampled signal A1, which sampled signal is stored in flip-flop 134.

During the first half cycle of the next timing pulse period, flip-flop 164 remains set because the count of counter means 141 has not as yet been decremented to a count of zero. Thus, coincidence means 168 is not activated to supply a binary "1" to the reset input terminal of flip-flop 164. Accordingly during the second half cycle of the timing pulse period the signal stored in the first stage of shift register 121, which signal corresponds to signal A12, is shifted into shift register 151, the contents of shift register 121 are shifted one stage to the left, the count of counter means 124 is incremented, the contents of shift register 151 are shifted one stage to the right, the count of counter means 152 is incremented, and the count of counter means 141 is decremented to a count of two. It is recognized therefore, that two of the signals of the group of signals under investigation remain in shift register 121. Although the count of two serves to provide a binary "1" at an input terminal of coincidence means 142, it may be observed that flip-flop 163 has remained in its reset state and therefore coincidence means 142 is supplied with a binary "0" by the 1 output terminal of flip-flop 163. Hence coincidence means 142 remains deactivated. It is further observed that counter means 141 has not as yet attained a count equal to zero and flip-flop 164 remains in its set state. Consequently, the remaining signals A13 and A14 stored in shift register 121 are shifted into shift register 151 during the second half cycles of the next succeeding timing pulse periods. When the group of signals associated with signal A1 has been shifted out of shift register 121, counter means 141 attains a count equal to zero. Consequently coincidence means 168 is provided with a binary "1" at each input terminal thereof and during the first half cycle of the next timing pulse period, flip-flop 164 is reset and a binary "1" is applied to an input terminal of coincidence means 169. It is appreciated that the count exhibited by counter means 124 is not as yet equal to 213 and therefore a binary "0" is applied to inverting means 170 by lead 125. Hence coincidence means 169 is also supplied with a binary "1" at each input terminal thereof and flip-flop 165 is set to its 1 state. During the second half cycle of the timing pulse period the binary "1" provided at the 1 output terminal of flip-flop 165 sets counter means 141 to a count equal to four. At this time the serially stored signals stored in shift register 121 are, in consecutive order, A2, A21, A22, A23, A24, A11, A111, A112, A113, A114, . . . A2444, and the signals stored in shift register 151 are, in consecutive order, A0, A1, A2, A11, A12, A13 and A14.

During the first half cycle of the next timing pulse period the binary "1" provided at the 1 output terminal of flip-flop 165 is effective to reset flip-flop 165 and to set flip-flop 162 to its 1 state. Accordingly, a binary "1" provided at the 1 output terminal of flip-flop 162 is applied to the common connected input terminals of coincidence means 131 and 133 such that the state of the signal stored in the first stage of shift register 121 may be detected. It is recalled that the signal stored in said first stage corresponds to signal A2 which is representative of the information content of a group of signals and has been assumed to be a binary "0". Accordingly coincidence means 133 is provided with a binary "1" at each input terminal thereof but coincidence means 131 is provided with a binary "0" at one input terminal thereof. Hence a binary "1" is applied to the reset input terminal of flip-flop 134 by coincidence means 133. During the second half cycle of the timing pulse period flip-flop 134 is reset to its 0 state so as to store the detected state of signal A2, which signal is stored in the first stage of shift register 121. During the first half cycle of the next timing pulse period flip-flop 162 is reset and flip-flop 163 is set so as to provide a binary "1" at the 1 output terminal thereof. The binary "1" is applied to OR-circuit 145 and to an input terminal of coincidence means 142. The count of counter means 141 has previously been set to a count equal to four and therefore coincidence means 142 is not activated notwithstanding the binary "1" supplied thereto by the 1 output terminal of flip-flop 163. During the second half cycle of the timing pulse period however, the signal A2 stored in the first stage of shift register 121 is shifted out therefrom and the count of counter means 124 is incremented. It should now be clear that once the signal representative of the information content of a group of signals has been sampled said signal is no longer necessary to the operation of the apparatus represented in FIG. 4 and therefore, may be shifted out of shift register 121 and subsequently discarded.

During the first half cycle of the next timing pulse period flip-flop 163 is reset and flip-flop 164 is set so as to provide a binary "1" at the common connected input terminals of coincidence means 143 and 144 and at the third input terminal of counter means 141. Since signal A2 has been assumed to be a binary "0", flip-flop 134 provides a binary "1" at the 0 output terminal thereof and coincidence means 144 is activated to produce a binary "1" which is supplied to lead 123 by OR-circuit 145. It is clear however, that OR-circuit 146 is not supplied with a binary "1" and therefore a binary "0" is produced at the output terminal thereof. During the second half cycle of the timing pulse period, and in fact, during the second half cycle of the next three timing pulse periods, the contents of shift register 121 are shifted a total four stages to the left and counter means 124 is incremented by a total count of four. Accordingly, the four signals comprising the group of signals A21 – A24 are shifted out of shift register 121 but are not shifted into shift register 151. Hence, the count of counter means 152 is not incremented. Thus it may be seen that if a group of signals stored in shift register 121 does not contain non-redundant information, i.e., if each signal of said group of signals is a binary "0", said group of signals is discarded. When the group comprised of signals A21 – A24 is shifted out of shift register 121 the count attained by counter means 141 is equal to zero. Since, during the first half cycle of the next timing pulse period, flip-flop 164 is reset and since the count attained by counter means 124 has not yet reached 213, flip-flop 165 is set. During the second half cycle of the timing pulse period the count of counter means 141 is set equal to four, and during the first half cycle of the next timing pulse period flip-flop 165 is reset and flip-flop 162 is set. Accordingly, the apparatus illustrated in FIG. 4 performs the aforedescribed operation on each group of signals associated with OR-circuits 112_a_ . . . 112_m_ of the second column or level of OR-circuits illustrated in FIG. 2. Since signal A11 now stored in the first stage of shift register 121 is a binary "1" each of signals A111 – A114 will be shifted from shift register 121 to shift register 151. But none of the remaining signals representative of the information content of the group of signals associated with the OR-circuits 112_b_ . . . 112_m_ of the second column or level of OR-circuits illustrated in FIG. 2 are binary "1"s. Accordingly, each of said remaining groups of signals will be shifted out of shift register 121 and discarded. The aforedescribed operation is repeated for each group of signals applied to OR-circuits 111a . . . 111n of the first column or level of ORicircuit illustrated in FIG. 2.

When the last bit stored in shift register 121 is shifted out therefrom counter means 124 will exhibit a count equal to 213. In addition, shift register 151 will store those groups of signals containing non-redundant information and counter means 152 will exhibit a count equal to the total number of bits stored in shift register 151. The count attained by counter means 141 will be equal to zero and coincidence means 168 will apply a binary "1" to the reset input terminal of flip-flop 164 and to an input terminal of coincidence means 169. However lead 125 will now apply a binary "1" to inverter means 170 which in turn applies a binary "0" to coincidence means 169. Coincidence means 180 is now supplied with a binary "1" at each input terminal thereof and during the first half cycle of the next timing pulse period flip-flop 164 will be reset and coincidence means 180 will apply a binary "1" to the set input terminal of flip-flop 166 whereby said flip-flop 166 will be set. Coincidence means 180 may supply a binary "1" to further means, not shown, indicating the termination of an encoding cycle and the commencement of a transmission cycle. Thus it is seen that when the contents of shifts register 121 have been completely shifted out therefrom, counter means 124 attains a count equal to 213 and flip-flop 165 will remain in its reset state. The binary "1" provided at the 1 output terminal of flip-flop 166 is applied to leads 155 and 157. Thus during the second half cycle of each succeeding timing pulse period the coded data signals stored in shift register 151 will be serially shifted out therefrom in a right to left direction and the count of counter means 152 will be decremented accordingly. The output terminal of shift register 151 may be coupled to communication channel 17 by conventional modulation and conversion means, if desired, and the coded data signal may be serially transmitted such that the least significant bit is transmitted first and the most significant bit is transmitted last. When the last bit, i.e., the most significant bit A0, of the coded data signal is shifted out of shift register 151 the count of counter means 152 will be equal to zero and lead 158 will apply a binary "1" to an input terminal of coincidence means 171. It should be apparent that the binary "1 " provided at lead 158 which indicates the end of a transmitted data signal, may be applied to further means whereby a subsequent digital word is presented for encoding. Said further means may include means for advancing the scanning means 10 illustrated in FIG. 3. Since flip-flop 166 has remained in its set state, the 1 output terminal of said flip-flop will apply a binary "1" to the other input terminal of coincidence means 171. Thus during the first half cycle of the next timing pulse period flip-flop 166 will be reset and the apparatus illustrated in FIG. 4 assumes its initial state and is prepared to operate on the next multibit digital word supplied by the apparatus illustrated in FIG. 2.

To facilitate the explanation of the operation of the apparatus represented by the logic circuit diagram illustrated in FIG. 4 the limitations inherent in the previously assumed example have been reiterated. It should be apparent however that said inherent limitations are not intended to limit the scope of the present invention. Accordingly, the number of stages included in shift register 121 should be sufficient to accommodate each group of signals produced by encoding means 11 as well as each signal representative of the information content of an associated group. In addition, the direction in which the contents of shift registers 121 and 151 are shifted are arbitrary and may assume any desired direction. Furthermore the predetermined count to which counter means 141 is set in response to a signal applied to the first input terminal thereof is equal to the number of signals included in each group of signals. Although it has been assumed that a group of signals is comprised of four signals it is apparent that a group may be comprised of any arbitrary number of signals. Similarly the count to which counter means 141 is set in response to a signal applied to the second input terminal thereof should be equal to the number of signals included in the first group. The previously assumed example has contemplated a first group of signals comprised of signals A1 and A2; however it is apparent that a greater number of signals may be included in said group. Consequently counter means 141 may be set to any desired count in response to a signal applied to the second input terminal thereof.

Figure 5:
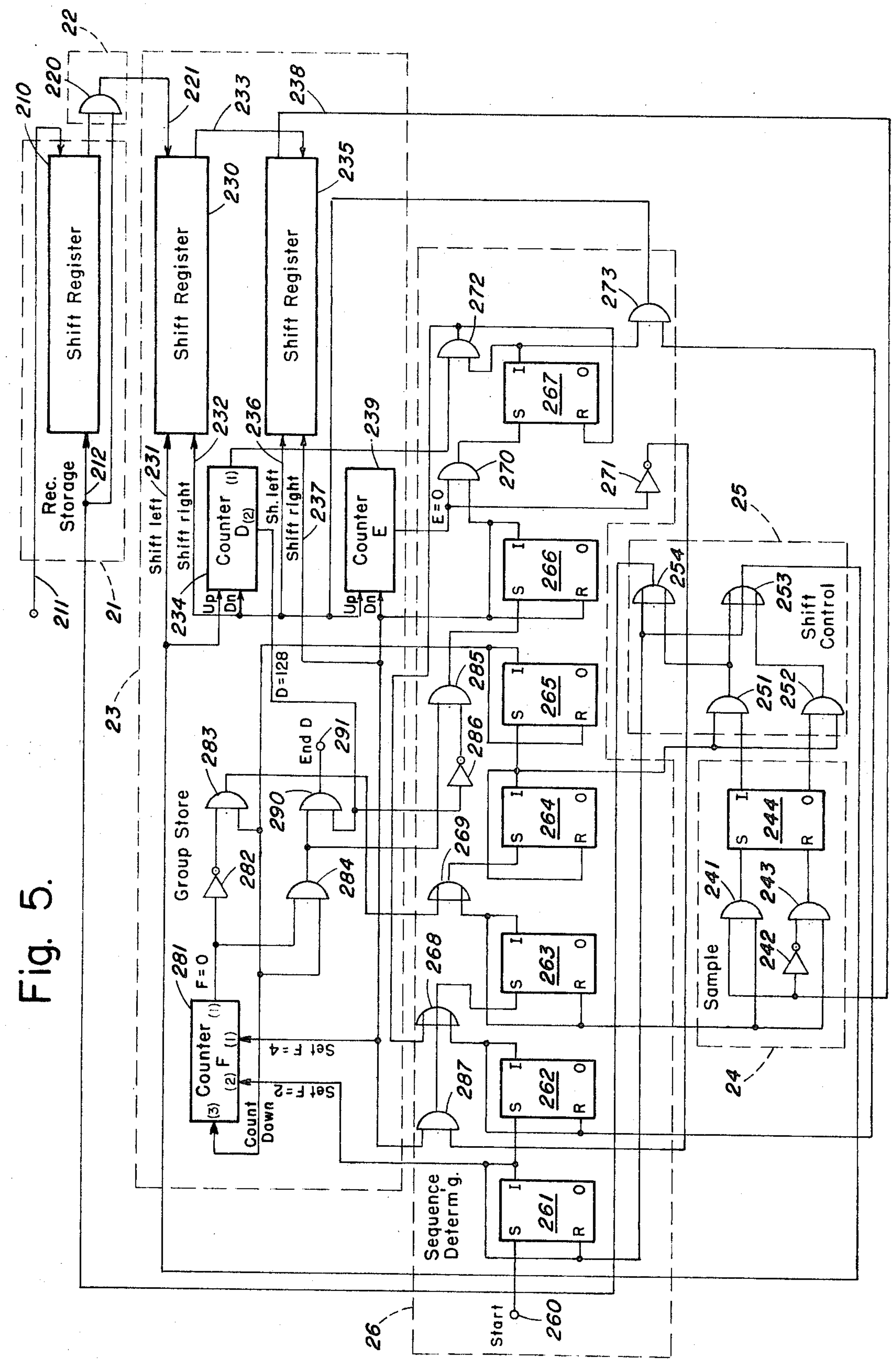
FIG. 5 is a logic diagram of a data compression receiving system in accordance with the present invention.

Turning now to FIG. 5 there is illustrated a logic circuit diagram of an exemplary embodiment of the receiving station which is comprised of receive storage means 21, store transfer means 22, group storage means 23, sampling means 24, shift control means 25 and sequence determining means 26. Receive storage means 21 is comprised of shift register 210 which may be a conventional plural stage shift register similar to aforedescribed shift register 151. Shift register 210 is adapted to receive data signals serially supplied thereto by lead 211. The data signals may be applied to lead 211 by conventional demodulating apparatus located at the receiving station; or alternatively the data signals may be applied directly to lead 211 from communications channel 17. It is recognized that if data signals are received in parallel form at the receiving station the received data signal may be correspondingly applied to shift register 210 in parallel form. In either case the shift register 210 is capable of shifting the contents thereof one stage to the right in response to a timing pulse supplied to each stage thereof if a binary "1" is applied to lead 212. The first stage of shift register 210, which appears as the rightmost stage in FIG. 5, includes an output terminal coupled to stored transfer means 22. Store transfer means 22 comprises a conventional coincidence means 220 such as an AND gate or the like, similar to the aforedescribed coincidence means of FIG. 4, and includes a second input terminal coupled to lead 212. The output terminal of coincidence means 220 is coupled to group storage means 23 by a lead 221. The coincidence means 220 is adapted to supply the signal stored in the first stage of shift register 210 to group storage means 23 when a binary "1" is applied to lead 212.

Group storage means 23 is comprised of shift registers 230 and 235 and counter means 234, 239 and 281. Shift register 230 may be a conventional plural stage shift register adapted to store data signals serially applied thereto by lead 221. The data signal bit applied by lead 221 is adapted to be stored in the first or rightmost stage of shift register 230 and the contents of the plural stages of shift register 230 are adapted to be shifted one stage to the left in response to a timing pulse supplied to shift register 230 if a binary "1" is supplied to lead 231. In addition, the contents of shift register 230 are adapted to be shifted one stage to the right in response to a timing pulse applied to shift register 230 if a binary "1" is applied to lead 232. Accordingly, shift register 230 may include conventional gating means coupled to leads 231 and 232 to control the selective shifting of the contents of the shift register 230. The first or rightmost stage of shift register 230 includes an output terminal coupled to shift register 235 by lead 233. Shift register 235 is similar to shift register 230 and may include conventional gating circuits for the selective shifting of the contents of shift register 235. Accordingly, the contents of shift register 235 may be shifted one stage to the left when a binary "1" is applied to lead 236 coupled thereto; and the contents of shift register 235 may be shifted one stage to the right when a binary "1" is applied to lead 237 coupled thereto. The first or rightmost stage of shift register 235 includes an output terminal coupled to lead 238.

Counter means 234 is adapted to provide a count indicative of the number of bits stored in shift register 230. Accordingly, counter means 234 may comprise a conventional reversible binary counter, the count of which may be selectively incremented or decremented in response to a timing pulse applied thereto. A first or "count-up" input terminal of counter means 234 is incremented each time shift register 230 stores an additional data signal bit. A second or "count-down" input terminal is coupled to lead 232 so that the count of counter means 234 is decremented each time a data signal bit is shifted out of the first or rightmost stage of shift register 230. Counter means 234 additionally includes a first output terminal coupled to sequence determining means 26 for providing thereat an indication that none of the stages of shift register 230 are occupied. Further, counter means 234 includes a second output terminal coupled to sequence determining means 26 for providing thereat an indication that a predetermined number of data signal bits is stored in shift register 230. Counter means 239 is similar to counter means 234 and is adapted to indicate the number of data signal bits stored in shift register 235. Accordingly, the count of counter means 239 is capable of being selectively incremented and decremented in response to a timing pulse supplied thereto. A first or "count-up" input terminal of counter means 239 is coupled to lead 236 and is responsive to a binary "1" supplied thereto for incrementing the count of counter means 239. A second or "count-down" input terminal is coupled to lead 237 and is responsive to a binary "1" supplied thereto for decrementing the count of counter means 239. Counter means 239 additionally includes an output terminal for providing thereat an indication that none of the stages of shift register 235 is occupied by a data signal bit. The output terminal of counter means 239 is coupled to sequence determining means 26.

Counter means 281 included in group storage means 23 is similar to aforedescribed counter means 141 illustrated in FIG. 4 and is adapted to provide an indication of the number of signals included in a group of signals that are shifted into shift register 230. The counter means may comprise a plural stage binary counter capable of decrementing the count thereof in response to a timing pulse supplied thereto. A first input terminal of counter means 281 is coupled to sequence determining means 26 and is adapted to receive a signal capable of setting the count of counter means 281 to a predetermined number corresponding to the number of signals included in a group of signals. A second input terminal of counter means 281 is coupled to sequence determining means 26 and is adapted to receive a signal for setting the count of counter means 281 to a different predetermined number for a purpose soon to be described. A third input terminal of counter means 281 is coupled to sequence determining means 26 and is capable of receiving a binary "1" for enabling the count of counter means 281 to be decremented in response to a timing pulse applied to the counter means. Counter means 281 includes an output terminal whereat a binary "1" is provided when a complete group of signals is shifted into shift register 230. The output terminal of counter means 281 is coupled to an input terminal of coincidence means 283 via inverter means 282 and in addition, to an input terminal of coincidence means 284. Coincidence means 283 and 284 are similar to aforedescribed coincidence means 220 and need not be further described herein. Furthermore, inverter means 282 is similar to aforementioned inverter means 132 illustrated in FIG. 4. A second input terminal of each of coincidence means 283 and 284 is connected in common relationship to sequence determining means 26. As is illustrated, the output terminals of coincidence means 283 and 284 are coupled to sequence determining means 26. The output terminal of coincidence means 284 is further coupled to an input terminal of coincidence means 290, the latter being capable of generating a binary "1" at the output terminal thereof when the original information signals have been reconstructed in shift register 230 as will soon be described.

Sampling means 24 is similar to aforementioned sampling means 13 and is comprised of coincidence means 241 and 243 and flip-flop 244. Each of the components of sampling means 24 may be identical to corresponding components of sampling means 13 and therefore need not be described in further detail herein. Coincidence means 241 includes a first input terminal coupled to the first or rightmost stage of shift register 235 by lead 238. Coincidence means 243 includes a first input terminal coupled to lead 238 via inverter means 242. A second input terminal of each of coincidence means 241 and 243 is connected in common relationship to sequence determining means 26. Inverter means 242 is similar to aforedescribed inverter means 132. The output terminals of coincidence means 241 and 243 are coupled to the set and reset input terminals of flip-flop 244 respectively. Accordingly, coincidence means 41 is capable of detecting a binary "1" stored in the first or rightmost stage of shift register 235 at predetermined intervals of time as determined by sequence determining means 26. Similarly coincidence means 243 is adapted to detect a binary "0" stored in said first or rightmost stage of shift register 235 at said predetermined intervals of time. Flip-flop 244 is capable of storing the detected binary "1" or binary "0" and includes 1 and 0 output terminals coupled to shift control means 25. It is understood that flip-flop 244 may be similar to aforedescribed flip-flop 134 and may comprise a conventional timing pulse controlled flip-flop circuit well known to those of ordinary skill in the art and capable of storing a binary signal supplied thereto upon receipt of a timing pulse.

Shift control means 25 is comprised of coincidence means 251 and 252 and OR-circuits 253 and 254 which may be identical to corresponding coincidence means 143 and 144 and corresponding OR-circuits 145 and 146, respectively, previously described with reference to FIG. 4. First input terminals of coincidence means 251 and 252 are coupled to the 1 and 0 output terminals respectively, of flip-flop 244. Second input terminals of coincidence means 251 and 252 are connected in common relationship to sequence determining means 26. First and second input terminals of OR-circuits 253 and 254 are connected in common relationship to the output terminal of coincidence means 251 and second input terminals of OR-circuits 253 and 254 are connected in common relationship to sequence determining means 26. OR-circuit 253 additionally includes a third input terminal connected to the output terminal of coincidence means 252. The output terminal of OR-circuit 253 is coupled to lead 231 and is capable of supplying a binary "1" thereto for shifting a data signal bit into shift register 230. The output terminal of OR-circuit 254 is coupled to lead 212 and is capable of providing a binary "1" thereto for shifting a data signal bit out of the first or rightmost stage of shift register 210. It will soon be understood that a binary "1" produced by coincidence means 251 serves to transfer a group of signals in shift register 210 to shift register 230 whereas a binary "1" produced by coincidence means 252 serves to shift a self-generated, non-transmitted group of signals into shift register 230.

Sequence determining means 26 is comprised of a plurality of flip-flops 261 – 267, each of which may be similar to aforedescribed flip-flops 161 – 166 illustrated in FIG. 4, and a plurality of gating circuits for interconnecting the various flip-flops contained in said sequence determining means. As is now understood, each of flip-flops 261 – 267 is capable of storing a binary signal supplied thereto upon receipt of a timing pulse. Flip-flop 261 includes a set input terminal connected to a terminal 260. The operation of the apparatus represented in FIG. 5 is initiated by applying a binary "1" to terminal 260. Accordingly the terminal 260 may be coupled to a conventional start operation switch whereby a binary "1" is generated upon closure of said switch for initiating the operation soon to be described. The 1 output terminal of flip-flop 261 is coupled to the reset input terminal thereof and in addition to the second input terminals of aforedescribed OR-circuits 253 and 254. The 1 output terminal of flip-flop 261 is also coupled to the second input terminal of counter means 281. Flip-flop 262 includes a set input terminal coupled to the 1 output terminal of preceding flip-flop 261 and a 1 output terminal coupled in common relationship to an input terminal of OR-circuit 268 and to an input terminal of OR-circuit 273. The 1 output terminal of flip-flop 262 is additionally coupled to the reset input terminal thereof. It will soon be seen that a binary "1" provided at the 1 output terminal of flip-flop 262 is effective to shift a data signal bit from shift register 230 to shift register 235. OR-circuit 268 includes a second input terminal coupled to the output terminal of coincidence means 287 and a third input terminal. The output terminal of OR-circuit 268 is coupled to the set input terminal of flip-flop 263.

Flip-flop 263 includes a 1 output terminal connected to the reset input terminal thereof and in addition, to the common connected input terminals of coincidence means 241 and 243. The 1 output terminal of flip-flop 263 is further coupled to the set input terminal of flip-flop 264 via OR-circuit 269. OR-circuit 269 includes a second input terminal coupled to the output terminal of coincidence means 283. The 1 output terminal of flip-flop 264 is connected to the reset input terminal thereof and in addition, to the common connected input terminals of coincidence means 251 and 252. The 1 output terminal of flip-flop 264 is further connected to the set input terminal of flip-flop 265 which includes a 1 output terminal coupled to the reset input terminal thereof and to the common connected input terminals of coincidence means 283 and 284 and to the third input terminal of counter means 281.

Flip-flop 266, included in sequence determining means 26, has a set input terminal coupled to the output terminal of coincidence means 285. A first input terminal of coincidence means 285 is coupled to the output terminal of coincidence means 284 and a second input terminal of coincidence means 285 is coupled to inverter means 286. It will soon become apparent that flip-flop 266 enables the performance of an operation subsequent to the shifting of a group of signals into shift register 230. The 1 output terminal of flip-flop 266 is coupled to the reset input terminal thereof and in addition to an input terminal of coincidence means 287 and to the first input terminal of counter means 281. Accordingly, it will be seen that the sequence determined by the sequence determining means 26 is repeatable. The 1 output terminal of flip-flop 266 is additionally coupled to lead 237 and to the second or "count-down" input terminal of counter means 239. Furthermore, the 1 output terminal of flip-flop 266 is coupled to an input terminal of coincidence means 270. A second input terminal of coincidence means 270 is coupled to the output terminal of counter means 239. It may be observed that the output terminal of counter means 239 is also coupled to a second input terminal of coincidence means 287 via inverter means 271. The output terminal of coincidence means 270 is coupled to the set input terminal of flip-flop 267. The flip-flop 267 includes a 1 output terminal coupled in common relationship to an input terminal of coincidence means 272 and to leads 232 and 236 via OR-circuit 273. It may be noted, therefore, that flip-flop 267 is effective to enable the transfer of the contents of shift register 230 to shift register 235. A second input terminal of coincidence means 272 is connected to the first output terminal of counter means 234. Furthermore, the output terminal of coincidence means 272 is coupled to the reset input terminal of flip-flop 267 and to the set input terminal of flip-flop 263 via OR-circuit 268.

The operation of the receiving station illustrated in FIG. 5 will now be described. To facilitate the explanation of the present invention, the operation thereof will be described with reference to the previously assumed example. However, it should be clearly understood that the scope of the present invention is to be limited only by the scope of the appended claims and should not be constrained by the typical example to be described. Accordingly, it may be assumed that the original information signals to be reconstructed are comprised of 128 bits, and counter means 281 is capable of being set to a count equal to four by a binary "1" applied to the first input terminal thereof and to a count equal to two by a binary "1" applied to the second input terminal thereof.

The group of signals selectively transmitted by the transmitting station of the present invention are stored in consecutive order in shift register 210 such that the signals representative of the information content of the groups of preceding levels are stored in progressively succeeding order with respect to the signals representative of the information content of the groups of succeeding levels. Accordingly the groups of signals selectively transmitted by the apparatus of FIG. 4 are stored in shift register 210 in the consecutive order A0, A1, A2, A11, A12, A13, A14, A111, A112, A113, A114, A1111, A112, A1113 and A1114 wherein signal A0 is stored in the first or rightmost stage of shift register 210. It is of course understood that if other groups of signals containing non-redundant information are transmitted to the receiving station said other groups of signals will be stored in the appropriate stages of shift register 210 consistent with the stored consecutive order. Each of the shift registers, counter means and flip-flops are operable in response to timing pulses supplied thereto from a source of timing pulses not shown. For purposes of explanation it will be assumed that flip-flops 261 – 266 are operable during the first half cycle of a timing pulse period and the shift registers, counter means and flip-flop 244 are operable during a second half cycle of a timing pulse period.

When a start operation switch, now shown, is closed a binary "1" is supplied from terminal 260 to the set input terminal of flip-flop 261. During the first half cycle of a timing pulse period, flip-flop 261 will assume its set state and a binary "1" is supplied to the second input terminal of counter means 281 and to the common connected input terminals of OR-circuits 253 and 254. Accordingly OR-circuit 254 applies a binary "1" to lead 212 and to an input terminal of coincidence means 220. During the second half cycle of a timing pulse period, counter means 281 responds to the binary "1" applied to the second input terminal thereof and is set to a count equal to two. In addition the binary "1" produced by OR-circuit 254 is effective to shift the signal stored in the first or rightmost stage of shift register 210 out therefrom and to enable coincidence means 220 to supply the shifted signal to shift register 230. The binary "1" produced by OR-circuit 253 is applied to lead 132 coupled to shift register 230 such that the signal applied to lead 221 by coincidence means 220 is shifted into the first or rightmost stage of shift register 230. Furthermore the binary "1" supplied by OR-circuit 253 to the first or "count-up" input terminal of counter means 234 is effective to increment the count of said counter means.

During the first half cycle of the next timing pulse period, the binary "1" provided at the 1 output terminal of flip-flop 261 sets flip-flop 262, such that a binary "1" is provided at the 1 output terminal of the latter flip-flop, and resets flip-flop 261. During the second half cycle of this timing pulse period, the binary "1" provided at the 1 output terminal of flip-flop 262 and supplied to leads 232 and 236 by OR-circuit 273 is effective to shift the signal stored in the first or rightmost stage of shift register 230 into the first or rightmost stage of shift register 235. In addition the count obtained by counter means 234 is decremented and the count obtained by counter means 239 is incremented. At this time therefore, the signals stored in the first two stages of shift register 210 are signals A1 and A2, the stages of shift register 230 are empty, the first stage of shift register 235 is occupied by signal A0, counter means 234 exhibits a count equal to zero, and counter means 239 exhibits a count equal to one. During the first half cycle of the next timing pulse period, the binary "1" provided at the 1 output terminal of flip-flop 262 and supplied to the set input terminal of flip-flop 263 by OR-circuit 268 is effective to set flip-flop 263 to its set state. Flip-flop 262 is reset. The binary "1" thus provided at the 1 output terminal of flip-flop 263 enables coincidence means 241 and 243 to detect the state of the signal stored in the first or rightmost stage of shift register 235. If the signal stored in the first stage of shift register 235 is a binary "1", lead 238 provides said binary "1" to an input terminal of coincidence means 241 whereby coincidence means 241 produces a binary "1" at the output terminal thereof, and coincidence means 243 produces a binary "0" at the output terminal thereof. If however, the signal stored in the first stage is a binary "0", lead 238 supplies inverter means 242 with a binary "0" and inverter means 242 supplies coincidence means 243 with a binary "1" such that coincidence means 243 produces a binary "1" at the output terminal thereof and coincidence means 241 produces a binary "0" at the output terminal thereof. Hence flip-flop 244 is supplied with a binary "1" at the set input terminal if a binary " 1" is stored in the first stage of shift register 235 and conversely, the reset input terminal of flip-flop 244 is supplied with a binary "1" if a binary "0" is stored in the first stage of shift register 235. It is recalled that the signal A0 has been assumed to be a binary "1" and therefore, coincidence means 241 produces a binary "1" at the output terminal thereof. Accordingly, during the second half cycle of the timing pulse period, flip-flop 244 obtains its set state and a binary "1" is provided at the 1 output terminal of flip-flop 244.

During the first half cycle of the next timing pulse period, flip-flop 264 responds to the binary "1" supplied thereto from flip-flop 263 by OR-circuit 269 to obtain its set state whereas flip-flop 263 obtains its reset state. Accordingly, coincidence means 251 responds to the binary "1"s supplied thereto by flip-flops 264 and 244, respectively, to activate OR-circuits 253 and 254 to produce binary "1"s. It is observed that coincidence means 252 is supplied with a binary "0" by flip-flop 244 and therefore said coincidence means does not produce a binary "1" at the output terminal thereof. During the second half cycle of the timing pulse period, the binary "1" supplied to lead 212 by OR-circuit 254 is effective to shift the contents of the first or rightmost stage of shift register 210 out therefrom and coincidence means 220 is energized to supply the shifted signal to shift register 230 via lead 221. The binary "1" produced by OR-circuit 253 is applied to lead 231 whereby the shifted signal supplied to lead 221 is shifted into the first or rightmost stage of shift register 230. In addition, the binary "1" supplied to lead 231 is also supplied to the first or "count-up" input terminal of counter means 234 whereby said counter means increments the count thereof. During the first half cycle of the next timing pulse period, flip-flop 264 is reset and flip-flop 265 is set. Accordingly, a binary "1" is supplied to the third input terminal of counter means 281 by the 1 output terminal of flip-flop 265. During the second half cycle of the timing pulse period, counter means 281 responds to the binary "1" supplied to the third input terminal thereof to decrement the count of said counter means. At this time the first stage of shift register 210 stores signal A2, the first stage of shift register 230 stores signal A1, the count obtained by counter means 234 is equal to one, the signal stored by the first stage of shift register 235 is signal A0, the count of counter means 239 is equal to one, and the count obtained by counter means 281 has been reduced to a count of one. Accordingly the output terminal of counter means 281 supplies a binary "0" to inverter means 282 which in turn supplies coincidence means 283 with a binary "1". The binary "1" provided at the 1 output terminal of flip-flop 265 is supplied to a second input terminal of coincidence means 283 such that a binary "1" is supplied to the set input terminal of flip-flop 264 by OR-circuit 269. Hence during the first half cycle of the next timing pulse period, flip-flop 265 is reset and flip-flop 264 is set. The binary "1" supplied to shift control means 25 by the 1 output terminal of flip-flop 264 enables shift control means 25 to perform the operation described in detail hereinabove. Accordingly, the binary "1"s supplied to coincidence means 251 by the 1 output terminal of each of flip-flops 244 and 264 energize coincidence means 251 to supply a binary "1" to lead 212 via OR-circuit 254 and to supply a binary "1" to lead 231 via OR-circuit 253. During the second half cycle of the timing pulse period, the signal stored in the first stage of shift register 210 is shifted out therefrom and coincidence means 220 supplies the shifted signal to shift register 230 via lead 221. The signal supplied to shift register 230 is shifted therein and the count of counter means 234 is incremented. During the first half cycle of the next timing pulse period flip-flop 264 is reset and flip-flop 265 is set such that a binary "1" provided at the 1 output terminal of flip-flop 265 is supplied to the third input terminal of counter means 281. It may be appreciated that during the second half cycle of the timing pulse period, the count of counter means 281 is decremented to a count equal to zero. At this time the first four stages of shift register 210 store, in consecutive order, A11 – A14, the first two stages of shift register 230 store, in consecutive order, signal A2 and signal A1, and shift register 235 stores signal A0 in the first stage thereof. In addition the count obtained by counter means 234 is equal to a count of two and the count obtained by counter means 239 is equal to a count of one.

Whereas the count of counter means 281 has been decremented to a count of zero, coincidence means 284 is supplied with a binary "1" at a first input terminal thereof by the output terminal of counter means 281 and a binary "1" at the second input terminal thereof by the 1 output terminal of flip-flop 265. Accordingly, coincidence means 284 applies a binary "1" to coincidence means 285. Since the count obtained by counter means 234 is not as yet equal to 128, a binary "0" is applied to inverter means 286 which in turn supplies coincidence means 285 with a binary "1" at a second input terminal thereof. It will be recognized that coincidence means 283 does not produce a binary "1" at the output terminal thereof because inverter means 282 applies a binary "0" to the input terminal of coincidence means 283. Consequently, during the first half cycle of the next timing pulse period, flip-flop 265 is reset and coincidence means 285 serves to set flip-flop 266. During the second half cycle of the timing pulse period, the binary "1" provided at the 1 output terminal of flip-flop 266 and supplied to lead 237 is effective to shift the contents of shift register 235 one stage to the right. Accordingly, the signal A0 stored in the first stage of shift register 235 is shifted out therefrom and the count of counter means 239 is decremented to a count equal to zero. A binary "1" is thus provided at the output terminal of counter means 239. It is noted that flip-flop 263 has maintained its reset state and therefore coincidence means 241 and 243 do not respond to the signal shifted out of shift register 235. The binary "1" provided at the 1 output terminal of flip-flop 266 is additionally applied to the first input terminal of counter means 281 so that counter means 281 is set to a count of four. Coincidence means 270 responds to the binary "1" supplied to the first input terminal thereof by the 1 output terminal of flip-flop 266 and to the binary "1" supplied to the second input terminal thereof by the output terminal of the counter means 239 to supply the set input of flip-flop 267 with a binary "1". The binary "1" provided at the output terminal of counter means 239 when the count obtained by counter means 239 is equal to zero, is inverted by inverter means 271 whereupon a binary "0" is supplied by inverter means 271 to coincidence means 287. Consequently during the first half cycle of the next timing pulse period, flip-flop 266 is reset and flip-flop 267 is set. During the second half cycle of the timing pulse period, the binary "1" provided at the 1 output terminal of flip-flop 267 is supplied by OR-circuit 273 to leads 232 and 236 whereby the signal stored in the first stage of shift register 230 is shifted into the first stage of shift register 235, counter means 234 is decremented and counter means 239 is incremented accordingly. At this time the first four stages of shift register 210 store signals A11 – A14 in consecutive order, shift register 230 stores signal A1 in the first stage thereof and shift register 235 stores signal A2 in the first stage thereof. The output terminal of counter means 234 supplies coincidence means 272 with a binary "0", indicating that the count obtained by counter means 234 is not as yet zero, and coincidence means 272 produces a binary "0". Accordingly, during the first half cycle of the next timing pulse period, flip-flop 267 remains in its set state and flip-flops 261 – 266 remain in their respective reset states. Therefore, during the second half cycle of the timing pulse period, the binary "1" provided at the 1 output terminal of flip-flop 267 is again supplied by OR-circuit 273 to leads 232 and 236 whereupon the signal stored in the first stage of shift register 230 is shifted into the first stage of shift register 235 and the contents of shift register 235 are shifted one stage to the left. Accordingly, the stages of shift register 230 are now empty and shift register 235 stores, in consecutive order, signals A1 and A2. The count of counter means 234 has now been decremented to zero and a binary "1" is applied to coincidence means 272 by the first output terminal of counter means 234. Hence during the first half cycle of the next timing pulse period, the binary "1" produced by coincidence means 272 is effective to reset flip-flop 267 and is applied to the set input terminal of flip-flop 263 by OR-circuit 268 whereupon flip-flop 263 obtains its set state.

It is recalled that when flip-flop 263 is set, coincidence means 241 and 243 are enabled to detect the state of the signals stored in the first stage of shift register 235. Accordingly, if the signal A1 now stored in the first stage of shift register 235 is a binary "1", coincidence means 241 supplies the set input terminal of flip-flop 244 with a binary "1" and conversely, if the signal A1 stored in the first stage of shift register 235 is a binary "0", coincidence means 243 supplies the reset input terminal of flip-flop 244 with a binary "1". In accordance with the previously assumed example, signal A1 is a binary "1" and, during the second half cycle of the timing pulse period, flip-flop 244 is set. During the first half cycle of the next timing pulse period, the set input terminal of flip-flop 264 is supplied with a binary "1" by OR-circuit 269 and flip-flop 263 is reset and flip-flop 264 is set. Accordingly coincidence means 251 produces a binary "1" and coincidence means 242 produces a binary "0". The binary "1" produced by coincidence means 251 is supplied to lead 212 by OR-circuit 254 and to lead 231 by OR-circuit 253. Hence, during the second half cycle of the timing pulse period, the signal stored in the first stage of shift register 210 is shifted out therefrom and coincidence means 220 supplies the shifted signal to shift register 230 by lead 221. Since lead 231 is supplied with a binary "1", the shifted signal is stored in the first stage of shift register 230. In addition, counter means 234 is responsive to the binary "1" supplied to lead 231 such that the count of counter means 234 is incremented. During the first half cycle of the next timing pulse period, flip-flop 264 is reset and flip-flop 265 is set to supply the third input terminal of counter means 281 with a binary "1". Consequently, during the second half cycle of the timing pulse period, the count of counter means 281 is decremented to a count equal to three and coincidence means 283 is provided with a binary "1" at each input terminal thereof. Hence during the first half cycle of the next timing pulse period, flip-flop 265 is reset and flip-flop 264 is set, thereby enabling the foregoing operation performed by shift control means 25 to be repeated. It should now be appreciated that said foregoing operation is repeated until the count obtained by counter means 281 is equal to zero. At this time, the signals stored in the first four stages of shift register 210 are, in consecutive order, A111 – A114, the signals stored in the first four stages of shift register 230 are, in consecutive order, A14, A13, A12 and A11, the signals stored in the first two stages of shift register 235 are, in consecutive order, A1 and A2, the count exhibited by counter means 234 is equal to four, the count exhibited by counter means 239 is equal to two, and the count exhibited by counter means 281 is equal to zero. When the count obtained by counter means 281 is equal to zero, a first input terminal of coincidence means 284 is supplied with a binary "1" by the 1 output terminal of flip-flop 265 and a second input terminal of coincidence means 284 is supplied with a binary "1" by the output terminal of counter means 281. Hence coincidence means 285 is provided with a binary "1" by coincidence means 284 and with an additional binary "1" by inverter means 286 which is responsive to the binary "0" supplied thereto by the second output terminal of counter means 234. Thus, during the first half cycle of the next timing pulse period, flip-flop 265 is reset and flip-flop 266 is set. The binary "1" provided at the 1 output terminal of flip-flop 266 is supplied to lead 237, to the first input terminal of counter means 281, and to an input terminal of coincidence means 287. During the second half cycle of the timing pulse period, the signal A1 stored in the first stage of shift register 235 is shifted out therefrom, the count of counter means 239 is decremented, and the count of counter means 281 is set equal to a count of four. It may be observed that the contents of shift register 235 have not as yet been reduced to zero. Accordingly counter means 239 provides a binary "0" at the output terminal thereof, which binary "0" is inverted by inverter means 271 whereupon a binary "1" is supplied to another input terminal of coincidence means 287, and coincidence means 287 applies a binary "1" to OR-circuit 268. Consequently during the first half cycle of the next timing pulse period, flip-flop 266 is reset and flip-flop 263 is supplied with a binary "1" at the set input terminal thereof by OR-circuit 268, whereupon flip-flop 263 is set. At this time shift register 210 stores, in consecutive order, the groups of signals selectively transmitted by the transmitting station, i.e., signals A111 – A114 and signals A1111 – A1114, shift register 230 stores, in consecutive order, signals A14, A13, A12 and A11, and shift register 235 stores signal A2 in the first stage thereof. Signal A2 stored in the first stage of shift register 235, is supplied to coincidence means 241 and 243 via lead 238. Since signal A2 has previously been assumed to be a binary "0", coincidence means 241 produces a binary "0" at the output terminal thereof and coincidence means 243 produces a binary "1" at the output terminal thereof. Hence, during the second half cycle of the timing pulse period, flip-flop 244 is reset and a binary "1" is supplied to coincidence means 252 by the 0 output terminal of flip-flop 244. During the first half cycle of the next timing pulse period, the binary "1" provided at the 1 output terminal of flip-flop 263 is effective to reset flip-flop 263 and is supplied to the set input terminal of flip-flop 264 by OR-circuit 269 whereupon flip-flop 264 is set. Hence, coincidence means 252 is supplied with a binary "1" at each input terminal thereof and OR-circuit 253 is activated to apply a binary "1" to lead 231. It is noted herein that since flip-flop 244 has been reset, i.e., flip-flop 244 stores the detected binary "0" sampled by coincidence means 243, coincidence means 251 produces a binary "0" at its output terminal. Hence lead 212 is supplied with a binary "0" and coincidence means 220 is provided with a binary "0" at an input terminal thereof. Accordingly during the second half cycle of the timing pulse period, shift register 210 is unaffected and shift register 230 stores the signal supplied thereto by coincidence means 220 in the first stage thereof. Since coincidence means 220 is supplied with a binary "0" at an input terminal thereof, a binary "0" is applied to lead 222 and shift register 230 stores a binary "0" in the first stage thereof. Counter means 234 is incremented accordingly.

The binary "1" provided at the 1 output terminal of flip-flop 264 is effective to reset flip-flop 264 during the first half cycle of the next timing pulse period and to set flip-flop 265. The binary "1" thus produced at the 1 output terminal of flip-flop 265 is applied to the third input terminal of counter means 281 such that during the second half cycle of the timing pulse period, the count of counter means 281 is decremented. Since counter means 281 has not attained a count of zero the output terminal thereof supplies inverter means 282 with a binary "0", which inverter means supplies coincidence means 283 with a binary "1". Accordingly coincidence means 283, which is also provided with a binary "1" by the 1 output terminal of flip-flop 265, activates OR-circuit 269 to supply the set input terminal of flip-flop 264 with a binary "1". During the first half cycle of the next timing pulse period, flip-flop 264 is set and flip-flop 265 is reset whereupon the foregoing operation is repeated. It should be appreciated that binary "0"s are consecutively generated by coincidence means 220 and stored in shift register 230 until counter means 281 attains a count of zero. At this time the signals stored in shift register 210 consist of the two groups of signals selectively transmitted by the transmitting station, the signals stored in shift register 230 are, in consecutive order and reading from right to left, 0000, A14, A13, A12 and A11, the signals stored in shift register 235 consist of signal A2 stored in the first stage thereof, the count exhibited by counter means 234 is equal to a count of eight, and the count exhibited by counter means 239 is equal to a count of one. Since the count of counter means 281 has been decremented to a count of zero, coincidence means 284 supplies coincidence means 285 with a binary "1" and inverter means 286 supplies coincidence means 285 with a binary "1". Hence, during the first half cycle of the next timing pulse period, flip-flop 265 is reset and flip-flop 266 is set. It may be recognized that the binary "1" provided at the 1 output terminal of flip-flop 266 is applied to lead 237 and to the first input terminal of counter means 281. Said binary "1" is additionally applied to an input terminal of coincidence means 270 and to an input terminal of coincidence means 287. Therefore, during the second half cycle of the timing pulse period the signal stored in the first stage of shift register 235 is shifted out therefrom, counter means 239 is decremented and counter means 281 is set to a count equal to four. Counter means 239 now exhibits a count of zero such that coincidence means 270, which is supplied with a binary "1" at each input terminal thereof, supplies the set input terminal of flip-flop 267 with a binary "1". Consequently during the first half cycle of the next timing pulse period, flip-flop 266 is reset and flip-flop 267 is set such that a binary "1" is supplied to OR-circuit 273 which in turn supplies a binary "1" to leads 232 and 236. It is now understood that the contents of shift register 230, which consist of each group of signals included in the third level of the assumed example, are serially shifted into shift register 235 during the second half cycles of the next sequence of timing pulse periods. When the last signal stored in shift register 230 is shifted into shift register 235 the count attained by counter means 234 is equal to zero and coincidence means 272 is supplied with a binary "1" at each input terminal thereof to produce a binary "1" at the output terminal thereof. It should be noted that at this time shift register 210 stores the remaining groups of signals selectively transmitted by the transmitting station, the stages of shift register 230 are empty, and shift register 235 stores each group of signals included in the third level of the assumed example. It is recalled from the description of FIG. 2 that each signal included in a group of signals in a third level is representative of the information content of a group of signals included in the immediately preceding or second level. Accordingly each of the signals stored in shift register 235 is representative of the information content of an associated group of signals included in the second level. Thus, the signal stored in the first stage of shift register 235, i.e., signal A11, is representative of the group of signals comprised of signals A111 – A114, each of which signals were applied to OR-circuit **112*a* of FIG. 2. Similarly, the signal stored in the second stage of shift register 235, i.e., signal A12, is representative of the information content of signals A121 – A124, which signals were applied to OR-circuit 112*b* of FIG. 2**.

During the first half cycle of the next timing pulse period, the binary "1" produced by coincidence means 272 is effective to reset flip-flop 267 and to set flip-flop 263. It is now readily apparent that the operation described in detail hereinabove is repeated. Thus, the signals stored in the stages of shift register 235 are consecutively sampled by sampling means 24. A group of signals is serially shifted into shift register 230 in response to each sampled signal. Hence, if the signal sampled by sampling means 24 is a binary "1", a group of signals stored in the first four stages of shift register 210 are shifted into shift register 230 via coincidence means 220; and if the signal sampled by sampling means 24 is a binary "0" a group of four binary "0"s is shifted into shift register 230 via coincidence means 220. Therefore, shift register 230 is utilized to reconstruct each group of signals included in a given level in accordance with the signals comprising the groups of signals included in an immediately succeeding level. Thus, each of the signals included in the groups of signals of the third level are stored in shift register 235 and are employed to reconstruct each group of signals included in the second level. As each group of signals included in the second level is reconstructed in shift register 230, the signal stored in shift register 235 and associated with the reconstructed group is shifted out therefrom. The reconstructed second level of groups of signals is then shifted into shift register 235 wherein the second level groups are stored in consecutive order. Each of the signals now stored in shift register 235 are representative of the information content of a group of signals in the immediately preceding level. Hence, the signals stored in shift register 235 are employed to reconstruct each of the groups of signals included in the first level in the manner aforedescribed. When the last signal of the last group of signals included in the first level is stored in shift register 230, the count attained by counter means 234 will, for purposes of explanation, be equal to 128. It is of course understood that the count attained by counter means 234 will be equal to the number bits stored in shift register 230 which, in turn, is equal to the number of original information signals that have been encoded by the transmitting station of FIG. 4. At that time flip-flop 265 will provide a binary "1" at the 1 output terminal thereof and counter means 281 will provide a binary "1" at its output terminal. Hence coincidence means 284 will supply each of coincidence means 290 and coincidence means 285 with a binary "1". However, counter means 234 now provides a binary "1" at the second output terminal thereof, indicating that the last signal of the last group of signals has been shifted into shift register 230. Accordingly, coincidence means 290 will be supplied with a binary "1" at each input terminal thereof and a binary "1" will be provided at terminal 291. It is recognized that the binary "1" provided at terminal 291 indicates that the decoding operation has been completed and that the original information signals are now stored in shift register 230. Accordingly terminal 291 may be coupled to further means, not shown, which are adapted to utilize the information signals stored in shift register 230. If the present invention is utilized in a facsimile transmission system it is understood that terminal 291 may be coupled to conventional document reproducing means such as a stylus or the like, whereby said document reproducing means may be controlled in accordance with the information signals stored in shift register 230. In addition, the binary "1" provided at terminal 291 may be utilized to reset the apparatus illustrated in FIG. 5 to an initial or quiescent state in preparation for subsequently received coded data signals. Hence the stages of shift register 210 and 235 may be reset, the counts of counter means 234, 239 and 281 may be reset to zero, and flip-flops 261 – 267 may be reset.

It should now be understood that the present invention as described and illustrated herein may be utilized in information communication systems such as a digital communication system or a video communication system wherein black and white information may be represented by binary signals. One of ordinary skill in the art will recognize that the present invention admits of various changes and modifications. For example, the number of groups in each column or level illustrated in FIG. 2 as well as the total number of columns or levels may be increased or decreased accordingly. In addition the number of signals comprising a group of signals may also be increased or decreased; and the groups of signals need not be comprised of equal numbers of signals. Furthermore the array of photosensitive devices illustrated as scanning means 10 in FIG. 3 may be arranged in other geometric configurations such as a square array or the like. Moreover, although the registers described with reference to FIGS. 4 and 5 are preferably shift registers, it is apparent that they may comprise plural stage storage registers wherein plural signals may be shifted out therefrom in parallel form. For example each group of signals may be transferred from one register to another register in parallel rather than in serial form if so desired. In addition, conventional devices other than the counter means described with reference to FIGS. 4 and 5 may be utilized to indicate the number of bits stored in the corresponding shift registers. It should also be recognized that the various counts to which counter means 141 and 281 are set correspond to the number of signals included in a group of signals as well as the number of signals applied to OR-circuit 114 illustrated in FIG. 2. Hence, if the encoding means illustrated in FIG. 2 is altered the count to which counter means 141 and 281 are set may be correspondingly altered.

While the invention has been particularly shown and described with reference to a specific embodiment thereof, it will be obvious to those of ordinary skill in the art that the foregoing and various other changes and modifications in form and details may be made without departing from the spirit and scope of the invention. It is therefore intended that the appended claims be interpreted as including all such changes and modifications.

What is claimed is:

1. A method of encoding an *n*-bit digital word, comprising the steps of:

forming a plurality of levels of groups of signals, each of said levels being comprised of a successively larger number of groups than the next succeeding level and the first level is comprised of the greatest number groups, each of said groups of said first level consisting of a distinct number of bits of said *n*-bit digital word and each of said groups of said remaining levels consisting of said distinct number of groups of the next preceding level;

combining each of said distinct number of bits of said *n*-bit digital word to produce binary signals representative of the information content of the associated first level groups by applying said distinct number of bits to the input terminals of an associated OR-circuit, each produced binary signal admitting of a first sense when any one of said associated combined bits admits of said first sense and of a second sense when none of said associated combined bits admits of said first sense;

further combining groups of binary signals at each level to produce succeeding level binary signals representative of the information content of associated combined groups by applying the binary signals produced by a distinct number of OR-circuits of a preceding level to the input terminals of an associated next level OR-circuit, each said succeeding level binary signal admitting of said first sense when any one of the binary signals applied to said associated next level OR-circuit admits of said first sense and of said second sense when none of the binary signals applied to said associated next level OR-circuit admits of said first sense;

storing the binary signals representative of the information content of each of said groups of said last level if any of the last level binary signals admits of said first sense;

storing in sequential form the binary signals representative of the information content of those groups of a level if a binary signal representative of the information content of a group of the next succeeding level consisting of those groups admits of said first sense; and storing each of the distinct number bits of a group of the first level if the binary signal representative of the information content of that group admits of said first sense.

2. A method of reproducing an n-bit digital word from a coded manifestation thereof comprised of selectively generated binary signals of a first and second sense, wherein said binary signals represent the information content of selected ones of a plurality of levels of groups of signals, comprising the steps of:

selectively storing binary signals representative of the information content of each group of the last level if any of said binary signals representative of the information content of each group of said last level admits of said first sense and selectively storing binary signals each admitting of a second sense if none of said binary signals representative of the information content of each group of said last level admits of said first sense;

selectively storing a distinct number of binary signals representative of the information content of each of said distinct number of groups of a given level, said last-mentioned distinct number of binary signals comprising a group of the next succeeding level, if the stored binary signal representative of the information content of said group of said next succeeding level admits of said first sense and selectively storing said distinct number of binary signals each admitting of a second sense if the stored binary signal representative of the information content of a group of the next succeeding level admits of said second sense; said last-mentioned step being performed in a level by level sequential manner such that the stored binary signals represent the information content of each group of each level from the last level to the first level; and selectively storing each of the distinct number of bits comprising a group of the first level if the stored binary signal representative of the information content of said group admits of said first sense and selectively storing a distinct number of predetermined bits if the stored binary signal representative of the information content of a group of the first level admits of said second sense.

3. The method of claim 2 wherein said step of selectively storing a distinct number of binary signals representative of the information content of each of said distinct number of groups of a given level comprises the steps of:

successively sampling each stored binary signal representative of the information content of each group of the next succeeding level;

successively storing the distinct number of binary signals comprising a group of said next succeeding level if the stored binary signal representative of the information content of said group of said next succeeding level admits of said first sense; and successively generating and storing a distinct number of binary signals each admitting of a second sense, if the stored binary signal representative of the information content of said group of said next succeeding level admits of said second sense.

4. The method of claim 3 wherein said step of selectively storing each of the distinct number of bits comprising a group of the first level comprises the steps of:

successively sampling each of the stored first level binary signals;

successively storing the distinct number of bits comprising a first level group if the stored first level binary signal representative of the information content of said first level group comprised of said distinct number of bits is a binary 1; and successively generating and storing a distinct number of binary 0's if the stored first level binary signal representative of the information content of a first level group is a binary 0.

5. A method of transmitting an *n*-bit digital word, comprising the steps of:

forming *y* levels of groups of signals, each of said *y* levels being comprised of at least one group whereby the first level is comprised of a multiplicity of groups, each of said multiplicity of groups of said first level consisting of a plurality of distinct bits of said *n*-bit digital word and each of said groups of said remaining levels consisting of a plurality of distinct groups of the next preceding level;

combining each of said plurality of distinct bits of said *n*-bit digital word to produce binary signals representative of the information content of the associated first level groups by applying said plurality of distinct bits to the input terminals of an associated OR-circuit, each produced binary signal admitting of a first sense when any one of said associated combined bits admits of said first sense and of a second sense when none of said associated combined bits admits of said first sense;

further combining groups of binary signals at each level to produce succeeding level binary signals representative of the information content of associated combined groups by applying the binary signals produced by a distinct number of OR-circuits of a preceding level to the input terminals of an associated next level OR-circuit, each said succeeding level binary signal admitting of said first sense when any one of the binary signals applied to said associated next level OR-circuit admits of said first sense and of said second sense when none of the binary signals applied to said associated next level OR-circuit admits of said first sense;

transmitting the binary signals representative of the information content of each group of the *y*th level if any of the *y*th level binary signals admits of said first sense;

transmitting the binary signals representative of the information content of those groups of a level if a binary signal representative of the information content of a group of the next succeeding level consisting of those groups admits of said first sense;

transmitting each of the plurality of distinct bits of a group of the first level if the binary signal representative of the information content of that group admits of said first sense;

receiving each said transmitted binary signal and each said transmitted bit; and reproducing said *n*-bit digital word from said received binary signals and said received bits.

6. The method of claim 5 wherein said step of reproducing said *n*-bit digital word comprises the steps of:

selectively storing binary signals representing the information content of each group of said *y*th level, said stored binary signals corresponding to said received binary signals representative of the information content of each of said groups of said *y*th level if any of the *y*th level binary signals admits of said first sense, and said stored binary signals corresponding to derived binary signals admitting of said second sense if none of the *y*th level binary signals admits of said first sense;

selectively storing binary signals representing the information content of each group of each remaining level, said last-mentioned stored binary signals corresponding to said received binary signals representative of the information content of those groups of a level if a binary signal representing the information content of a group of the next succeeding level consisting of those groups admits of said first sense, and said last-mentioned stored binary signals corresponding to derived binary signals admitting of said second sense if a binary signal representing the information content of a group of the next succeeding level consisting of those groups admits of said second sense, said last-mentioned step being performed in a level by level sequential manner such that the stored binary signals represent the information content of each group of each level from the *y*th level to the first level; and selectively storing the plurality of distinct bits of each group of the first level, said plurality of distinct bits corresponding to said received plurality of distinct bits of a group of the first level if a binary signal representing the information content of said group of said first level admits of said first sense, and said plurality of distinct bits corresponding to predetermined bits if a binary signal representing the information content of said group of said first level admits of said second sense.

7. A method of transmitting video information, comprising the steps of:

scanning an area;

dividing said area into a plurality of portions of successively decreasing size such that each given portion is comprised of a summation of the next smallest portions and said area is comprised of a summation of the largest portions;

combining the plural video information signals included in each of the smallest subdivided portions of said area to produce signals representative of the information content of the associated smallest portions by applying said plural video information signals to the input terminals of an associated OR-circuit, each produced signal admitting of a first sense when said associated smallest portion includes non-redundant information and of a second sense when said associated smallest portion includes redundant information only;

further combining signals representative of the information content of smaller portions to produce signals representative of the information content of associated next larger portions by applying the signals produced by a plurality of OR-circuits associated with a like plurality of smaller portions to the input terminals of an associated next larger portion OR-circuit, each said nest larger portion being comprised of a summation of a plurality of said smaller portions and each said produced signal admitting of a first sense when any one of the smaller portions comprising said next larger portion includes non-redundant information and of said second sense when all of said smaller portions comprising said next larger portion includes redundant information only;

transmitting a signal indicative of the information content of the scanned area; and selectively transmitting the produced signals representative of the presence of redundant and non-redundant information in respective portions in such manner that the selectively transmitted signals represent the presence of redundant and non-redundant information in portions of successively decreasing size whereby plural video information signals included in a smallest portion are transmitted when a signal representative of the presence of non-redundant information in said smallest portion is selectively transmitted.

8. The method of claim 7 wherein said step of transmitting a signal indicative of the information content of the scanned area, comprises the steps of:

providing a further OR-circuit, said further OR-circuit producing a first signal at an output terminal thereof if at least one of the signals supplied to the input terminals thereof represents non-redundant information; and applying the signal produced by the OR-circuits associated with said largest portions to the input terminals of said further OR-circuit.

9. The method of claim 8 wherein said step of selectively transmitting the produced signals representative of the presence of redundant and of non-redundant information in respective portions comprises the steps of:

successively sampling the signals produced by the OR-circuits associated with portions of successively decreasing size; and successively transmitting the signals applied to each of the input terminals of those OR-circuits associated with said portions of successively decreasing size when said sampled signals admit of a first sense indicating the presence of non-redundant information, such that plural video information signals included in said smallest portions are transmitted if the signals produced by those OR-circuits associated with said smallest portions and to which said plural video information signals are applied admit of said first sense.

10. A method of receiving data compressed video information comprised of a signal indicative of the information content of a scanned area and selective signals indicating the presence of redundant and non-redundant information in selective portions of successively decreasing size wherein a given portion is comprised of a summation of next smaller portions and said area is comprised of a summation of the largest portions, said selective signals including plural video information signals included in those smallest portions having non-redundant information present therein, comprising the steps of:

storing received signals representing the information content of each of the largest portions included in said scanned area when said received signal indicative of the information content of said scanned area admits of a first characteristic;

generating signals representing the information content of each of the largest portions included in said scanned area when said received signal indicative of the information content of said scanned area admits of a second characteristic; and selectively deriving the information content of each of the next smaller portions included in a given portion in accordance with the signal representing the information content of said given portion and said selective signals indicating the presence of redundant and non-redundant information in said next smaller portions whereby the plural video information signals included in each said smallest portion are selectively derived in accordance with the signal representing the information content of the next larger portion comprised of a summation of said smallest portions and said selective video information signals.

11. The method of claim 10 wherein said step of selectively deriving the information content of each of the next smaller portions comprises storing received signals representing the information content of each of the next smaller portions included in a given portion when the signal representing the information content of said given portion corresponds to said signal indicating the presence of non-redundant information in said given portion, and generating signals representing the information content of each of the next smaller portions included in a given portion when the signal representing the information content of said given portion corresponds to a signal indicating the presence of redundant information in said given portion, whereby said received video information signals included in those smallest portions having non-redundant information present therein are stored and video information signals included in those smallest portions having redundant information present therein are generated.

12. The method of claim 11 wherein said step of storing received signals and generating signals comprises the steps of:

successively sampling each signal representing the information content of a portion of a given size;

successively counting the number of next smaller portions comprising each portion of said given size;

storing a number of said received signals representing the information content of said next smaller portions corresponding to the counted number when said sampled signal admits of a first state indicating the presence of non-redundant information; and storing a number of generated signals, each said generated signal admitting of a second state indicating the presence of redundant information, corresponding to the counted number when said sampled signal admits of said second state.

13. A video transmission system, comprising:

scanning means for scanning an area and providing discrete video information signals in accordance with the information in said area;

a plurality of columns of combining means, each of said combining means including a plurality of input terminals and an output terminal whereby a signal admitting of a first state is provided at said output terminal if at least one of the signals supplied to said input terminals admits of said first state, the number of combining means included in each column being less than the number of combining means included in an immediately preceding column such that the output terminals of a plurality of combining means of a given column are coupled to the input terminals of one combining means of an immediately succeeding column, and the terminals of each combining means of a first column being supplied with said discrete video information signals by said scanning means;

transmitting means coupled to said combining means for selectively transmitting said combining means input signals and said discrete video information signals in accordance with the state of at least one of the signals supplied to the input terminals of an associated combining means; and receiving means for receiving said selectively transmitted combining means input signals and said selectively transmitted discrete video information signals and regenerating therefrom the information in said scanned area.

14. The video transmission system in accordance with claim 13 wherein said transmitting means comprises:

sampling means for sampling in consecutive order the signals provided at the output terminals of the combining means of successive columns such that the last column combining means output signals are sampled first and the first column combining means output signals are sampled last; and selective means coupled to said sampling means for transmitting the signals applied to each input terminal of a combining means if the signal provided at the output terminal of said combining means and sampled by said sampling means admits of a first state, said selective means being operable upon the sampling of each combining means output signal of a column.

15. A video transmission system in accordance with claim 14 wherein said sampling means comprises:

storage means having a plurality of stages for storing the signals provided at the output terminals of said combining means and the signals applied to the input terminals of said combining means such that each last column combining means output signal followed by said each last column combining means input signals are stored in serially preceding relationship in said storage means stages with respect to each immediately preceding column combining means output signal followed by said each immediately preceding column combining means input signals, whereby the final stages of said storage means serially store the combining means output signal followed by the combining means input signals of each of said first column combining means;

gating means coupled to the first stage of said storage means for detecting the state of the signal stored in said first stage at periodic intervals of time; and shift control means for shifting a combining means output signal followed by said combining means input signals out of said storage means and for shifting a next stored combining means output signal into said first stage of said storage means, in timed relation.

16. A video transmission system in accordance with claim 15 wherein said selective means comprises:

transmit store means coupled to said storage means and responsive to said shift control means for receiving said last column combining means output signal stored in the first stage of said storage means and selected ones of each combining means input signals stored in said storage means; and sample store means coupled to said gating means for storing said periodically detected state of the signal stored in said first stage; said sample store means being further coupled to said shift control means to enable said shift control means to selectively shift said combining means input signals from said storage means into said transmit store means at predetermined intervals of time in accordance with said stored detected state.

17. A video transmission system in accordance with claim 16 further including resettable sequence control means for enabling said gating means to detect the state of the signal stored in said first stage, for enabling said shift control means to shift a combining means output signal out of said storage means and for enabling said shift control means to shift combining means input signals into said transmit store means, in a predetermined consecutive order.

18. A video transmission system in accordance with claim 17 wherein said shift control means includes:

first gate means coupled to said sequence control means and said sample store means for applying a shift signal to said storage means at a pre-established point in said consecutive order when said detected state stored by said sample store means admits of a second state, whereby combining means input signals are shifted out of said storage means;

second gate means coupled to said sequence control means and said sample store means for applying a shift signal to said storage means and said transmit store means at said pre-established point in said consecutive order when said detected state stored by said sample store means admits of a first state, whereby combining means input signals are shifted into said transmit store means from said storage means; and first counter means for counting the number of combining means input signals shifted out of said storage means and indicating when the next signal to be shifted out of said storage means is a combining means output signal, whereby said sequence control means is reset.

19. A video transmission system in accordance with claim 18 wherein said transmit store means comprises:

shift register means for serially storing the signals applied thereto in accordance with said shift signal applied by said second gate means;

second counter means coupled to said shift control means for counting the number of signals shifted out of said storage means and for indicating when the last signal stored in said storage means is shifted out therefrom; and means coupled to said second counter means and responsive to said indication for activating said shift register means to serially shift out of said shift register means the signals stored therein.

20. A video transmission system in accordance with claim 13 wherein said receiving means comprises:

receive storage means for storing in consecutive order each signal of said selectively transmitted combining means input signals and each of said selectively transmitted discrete video information signals whereby the selectively transmitted combining means input signals of a given column are stored in groups in preceding relationship with respect to other groups of selectively transmitted combining means input signals of preceding columns and said selectively transmitted discrete video information signals are stored in groups in ultimate relationship; and decoding means coupled to said receive storage means for deriving from said stored combining means input signals and said stored discrete video information signals the discrete video information signals provided by said scanning means.

21. A video transmission system in accordance with claim 20 wherein said decoding means comprises inverse deriving means for generating a further plurality of groups of signals from each group of a given plurality of groups of signals wherein the total number of groups in said generated further pluralities of groups of signals is greater than the number of groups in said given plurality of groups of signals such that said given plurality of groups of signals is comprised of a combination of said generated further pluralities of groups of signals.

22. A video transmission system in accordance with claim 21 wherein said inverse deriving means comprises:

group storage means for storing a given plurality of groups of signals and a next larger plurality of groups of signals;

receiver sampling means coupled to said group storage means for sampling in consecutive order the signals of each group of said stored given plurality of groups of signals; and receiver selective means coupled to said receiver sampling means for transferring from said receive storage means to said group storage means a received group of combining means input signals if the signal sampled by said receiver sampling means admits of a first state and for applying to said group storage means a group of signals each of which signals admits of a second state if the signal sampled by said receiver sampling means admits of a second state, said applied group of signals being includable in the next larger plurality of groups of signals.

23. A video transmission system in accordance with claim 22 wherein said group storage means includes:

first register means having a plurality of stages for storing said given plurality of groups of signals;

second register means having a plurality of stages for storing said next larger plurality of groups of signals; and register transfer means for transferring the contents of said second register means to said first register means when said receiver sampling means has sampled the last signal of the last group of said stored given plurality of groups of signals.

24. A video transmission system in accordance with claim 23 wherein said receiver sampling means comprises:

gating means coupled to said first register means for periodically detecting the state of each signal stored in said first register means at predetermined intervals of time; and sample store means coupled to said gating means for storing said periodically detected state of said sampled signal.

25. A video transmission system in accordance with claim 24 wherein said receiver selective means comprises:

selective gating means intercoupling said receive storage means and said second register means for gating a group of combining means input signals into said second register means from said receive storage means; and selective gate control means coupled to said sample store means for activating said selective gating means to gate a group of combining means input signals into said second register means from said receive storage means when said stored detected state admits of said first state, said selective gate control means inhibiting said selective gate means such that a group of signals each admitting of said second state is gated into said second register means when said stored detected state admits of said second state.

26. A video transmission system in accordance with claim 25 further including resettable sequence control means for enabling said gating means to detect the state of each signal stored in said first register means, for enabling said selective gate control means to selectively activate and inhibit said selective gate means and for enabling said register transfer means to transfer the contents of said second register means to said first register means, in a predetermined consecutive order.

27. A video transmission system in accordance with claim 26 wherein said group storage means further includes:

first register counting means for counting the number of signals stored in said first register means and for indicating when the last signal of the last group of said given plurality of groups of signals has been sampled, said indication being applied to said resettable sequence control means whereby said resettable sequence control means is advanced to enable said register transfer means to transfer the contents of said second register means to said first register means;

second register counting means for counting the number of signals stored in said second register means and for indicating when the last group of said next larger plurality of groups has been transferred to said first register means, said last-mentioned indication being applied to said resettable sequence control means whereby said resettable sequence control means is advanced to enable said gating means to detect the state of each signal stored in said first register means, said second register counting means further providing an indication when said second register means stores said discrete video information signals provided by said scanning means; and group storage indicating means for applying an indication to said resettable sequence control means when a complete group of signals is stored in said second register means whereby said resettable sequence control means is advanced to enable said gating means to detect the state of a signal stored in said first register means.

28. A video transmission system, comprising:

scanning means for scanning an area and providing discrete video information signals in accordance with the information in said area;

a plurality of combining means coupled to said scanning means for dividing said scanned area into a plurality of portions of successively decreasing size such that each given portion is comprised of a summation of the next smallest portions and said area is comprised of a summation of the largest portions, each said combining means being associated with a corresponding portion and including an output terminal and a plurality of input terminals whereby a signal admitting of a first state is provided at said output terminal if at least one of the signals applied to said input terminals represents non-redundant information, said combining means being arranged such that the input terminals of a combining means associated with a given portion are coupled to the output terminals of those combining means associated with next smaller portions wherein said given portion is comprised of a summation of said next smaller portions, the smallest portion combining means being supplied with said discrete video information signals;

transmitting means coupled to said combining means for selectively transmitting combining means input signals in accordance with the state of said combining means output signals; and receiving means for receiving said selectively transmitted signals and regenerating therefrom the information in said scanned area.

29. The video transmission system in accordance with claim 28 wherein said transmitting means comprises:

sampling means for sampling in consecutive order the signals provided at the output terminals of combining means associated with portions of successively decreasing size such that the signals provided at the output terminals of combining means associated with the largest portions are sampled first and the signals provided at the output terminals of combining means associated with the smallest portions are sampled last; and selective means coupled to said sampling means for transmitting the signals applied to each input terminal of a combining means if the signal provided at the output terminal of said combining means and sampled by said sampling means admits of a first state, said selective means being operable upon the sampling of each signal provided at the output terminal of each combining means associated with a portion of like size.

30. The video transmission system in accordance with claim 29 wherein said receiving means comprises:

receive storage means for storing said transmitted signals such that the signals representative of the information content of the larger portions are stored in preceding relationship with respect to the signals representative of the information content of smaller portions; and information regenerating means coupled to said receive storage means for deriving from said stored signals the information content of each portion such that the discrete video information signals, which correspond to the information content of the smallest portions, are derived.

31. The video transmission system of claim 30 wherein said information regenerating means comprises means responsive to the signals representative of the information content of portions of like size to generate signals representative of the information content of those next smaller portions comprising said portions of like size.

32. A data compressed information transmission system for transmitting an n-bit digital word, comprising:

*y* levels of plural input OR-circuits, each level including at least one OR-circuit, said OR-circuits being arranged such that the plural inputs of an OR-circuit of a given level are coupled to the outputs of a corresponding number of OR-circuits of an immediately preceding level whereby the plural inputs of each of the OR-circuits of the *y*th level are coupled to the outputs of associated OR-circuits of the (*y*-1)th level and the plural inputs of each of the OR-circuits of the first level are supplied with a corresponding number of distinct bits of said *n*-bit digital word;

transmitting means coupled to said *y* levels of OR-circuits for selectively transmitting the plural signals applied to the inputs of an OR-circuit of a given level in accordance with the state of the output signal produced by said OR-circuit of said given level; and receiving means for receiving said selectively transmitted signals and regenerating said n-bit digital word therefrom.

33. A data compressed information transmission system in accordance with claim 32 wherein said transmitting means comprises:

sampling means for sampling in consecutive order the signals provided at the output terminals of the OR-circuits of successive levels such that the signals provided at the output terminals of the OR-circuits of the yth level are sampled first and the signals provided at the output terminals of the OR-circuits of the first level are sampled last; and selective means coupled to said sampling means for transmitting the signals applied to each input terminal of an OR-circuit if the signal provided at the output terminal of said OR-circuit and sampled by said sampling means admits of a first state, said selective means being operable upon the sampling of each signal provided at the output terminal of each OR-circuit of a level.

34. A data compressed information transmission system in accordance with claim 33 wherein said receiving means comprises:

receive storage means for storing said transmitted signals such that the signals applied to the inputs of OR-circuits of a given level are stored in groups in progressively succeeding order with respect to the signals applied to the inputs of OR-circuits of succeeding levels, said transmitted bits being stored in ultimate relationship; and information regenerating means coupled to said receive storage means for deriving from said stored signals the signals applied to the inputs of the OR-circuits of each level such that the n-bit digital word is derived.

35. A data compressed information transmission system in accordance with claim 34 wherein said information regenerating means comprises means responsive to said derived signals applied to the inputs of the OR-circuits of a given level to generate signals corresponding to the signals applied to the inputs of the OR-circuits of the next preceding level.

* * * * *